US009917628B2

(12) United States Patent
Liang et al.

(10) Patent No.: US 9,917,628 B2
(45) Date of Patent: Mar. 13, 2018

(54) BEAMFORMING IN A MU-MIMO WIRELESS COMMUNICATION SYSTEM WITH RELAYS

(71) Applicants: Ping Liang, Newport Coast, CA (US); Dengkui Zhu, Wanyuan (CN); Boyu Li, Irvine, CA (US); Yiming Ma, Irvine, CA (US)

(72) Inventors: Ping Liang, Newport Coast, CA (US); Dengkui Zhu, Wanyuan (CN); Boyu Li, Irvine, CA (US); Yiming Ma, Irvine, CA (US)

(73) Assignee: RF DSP Inc., Irving, CA (US)

( * ) Notice: Subject to any disclaimer, the term of this patent is extended or adjusted under 35 U.S.C. 154(b) by 0 days.

(21) Appl. No.: 15/518,149

(22) PCT Filed: Jan. 16, 2016

(86) PCT No.: PCT/US2016/013742
§ 371 (c)(1),
(2) Date: Apr. 10, 2017

(87) PCT Pub. No.: WO2016/115545
PCT Pub. Date: Jul. 21, 2016

(65) Prior Publication Data
US 2017/0257155 A1   Sep. 7, 2017

Related U.S. Application Data

(60) Provisional application No. 62/104,086, filed on Jan. 16, 2015.

(51) Int. Cl.
*H04B 7/06* (2006.01)
*H04B 7/0452* (2017.01)
(Continued)

(52) U.S. Cl.
CPC ......... *H04B 7/0617* (2013.01); *H04B 7/0452* (2013.01); *H04B 7/0456* (2013.01);
(Continued)

(58) Field of Classification Search
CPC  H04B 7/0452; H04B 7/0617; H04B 7/15507; H04L 25/0202; H04L 5/14
See application file for complete search history.

(56) References Cited

U.S. PATENT DOCUMENTS 7,123,676 B2 * 10/2006 Gebara ................. H01Q 1/521
375/364
2004/0095907 A1 * 5/2004 Agee .................... H04B 7/0417
370/334
(Continued)

FOREIGN PATENT DOCUMENTS

KR           101539553 B1    7/2015
WO    WO 2016115547 A1 *  7/2016  ........... H04B 7/0452

OTHER PUBLICATIONS

PCT/US2016/013742 International Preliminary Report on Patentability, WIPO, dated Aug. 5, 2016.

*Primary Examiner* — Devan Sandiford
(74) *Attorney, Agent, or Firm* — Guosheng Wang; United States Research and Patent Firm

(57) ABSTRACT

This invention presents methods for MU-MIMO wireless communication systems comprising a BS with plural of antennas, either closely located or distributed; A plural of AFRs deployed over a coverage area, each AFR has N_BF≥1 BF antennas with a beam pattern facing the MU-BFer and N_UF≥1 UF antennas with a beam pattern facing UEs or downstream AFR(s); A channel estimation module for estimating the Total Channels between a plural of UEs and the BS with the AFRs in place; and, A MU-BFer that uses the estimates of the Total Channels to perform beamforming computations for transmitting and/or receiving mul- (Continued)

tiple spatially multiplexed streams of signals to or from a plural of UEs using the same frequency resource.

34 Claims, 11 Drawing Sheets

(51) Int. Cl.
  *H04B 7/155* (2006.01)
  *H04L 25/02* (2006.01)
  *H04B 7/0456* (2017.01)
  *H04L 29/06* (2006.01)
  *H04B 17/336* (2015.01)
  *H04L 5/00* (2006.01)
  *H04W 16/28* (2009.01)
  *H04W 88/08* (2009.01)
  *H04L 5/14* (2006.01)
  *H04W 84/18* (2009.01)

(52) U.S. Cl.
  CPC ....... *H04B 7/15507* (2013.01); *H04B 17/336* (2015.01); *H04L 5/0048* (2013.01); *H04L 25/0202* (2013.01); *H04L 69/22* (2013.01); *H04W 16/28* (2013.01); *H04L 5/14* (2013.01); *H04W 84/18* (2013.01); *H04W 88/085* (2013.01)

(56) References Cited

U.S. PATENT DOCUMENTS

| | | | |
|---|---|---|---|
| 2008/0089267 A1* | 4/2008 | Zhu | H04B 7/15507 370/315 |
| 2008/0318520 A1* | 12/2008 | Kwun | H04B 7/0426 455/7 |
| 2009/0175214 A1* | 7/2009 | Sfar | H04B 7/15592 370/315 |
| 2012/0133557 A1* | 5/2012 | Beaudin | H01Q 1/005 342/368 |
| 2012/0238202 A1* | 9/2012 | Kim | H04W 72/1231 455/7 |
| 2012/0294224 A1* | 11/2012 | Silva | H04B 7/15521 370/315 |
| 2013/0114650 A1* | 5/2013 | Li | H04B 7/022 375/211 |
| 2013/0301487 A1* | 11/2013 | Khandani | H04W 16/14 370/278 |
| 2014/0225776 A1 | 8/2014 | Harel et al. | |
| 2014/0243043 A1* | 8/2014 | Shen | H04W 88/10 455/553.1 |
| 2014/0348055 A1 | 11/2014 | Hoymann et al. | |
| 2014/0348142 A1* | 11/2014 | Seo | H04L 5/0092 370/336 |
| 2016/0285533 A1* | 9/2016 | Li | H04B 7/0626 |
| 2016/0301457 A1* | 10/2016 | Liang | H04B 7/0452 |

\* cited by examiner

BEAMFORMING IN A MU-MIMO WIRELESS COMMUNICATION SYSTEM WITH RELAYS

This application claims the benefit of U.S. Provisional Application No. 62/104,086 filed on Jan. 16, 2015.

FIELD OF INVENTION

This invention relates generally to Multi-User Multiple-Input Multiple-Output (MU-MIMO) wireless communications, and more particularly, to beamforming in a MU-MIMO system with a number of amplify and forward relays.

BACKGROUND

To meet the continued fast growing demand of mobile data, the wireless industry needs solutions that can provide very high data rates in a coverage area to multiple users simultaneously including at cell edges at reasonable cost. Currently, the wireless telecom industry is focused on dense deployment of small cells, the so called ultra-dense networks, to increase spatial re-use of wireless spectrum as the solution for meeting the growing mobile data demand. Dense deployment of small cells requires a large number of backhauls and creates highly complex inter-cell interference. One solution to the interference problem is to require careful Radio Frequency (RF) measurement and planning and inter-cell coordination, which significantly increases the cost of deployment and reduces the spectral efficiency. Another solution is the Self-Organizing Network (SON) technology, which senses the RF environments, configures the small cells accordingly through interference and Tx management, coordinated transmission and handover. SON reduces the need for careful RF measurement and planning at the cost of increased management overhead and reduced spectral efficiency. The backhaul network to support a large number of small cells is expensive to be laid out.

Another method for increasing spatial re-use of wireless spectrum is MIMO, especially Multi-User MIMO (MU-MIMO). In a wireless communication system, a wireless node with multiple antennas, a Base Station (BS) or a User Equipment (UE), can use beamforming in downlink (DL) or uplink (UL) to increase the Signal-to-Noise Ratio (SNR) or Signal-to-Interference-plus-Noise Ratio (SINR), hence the data rate, of the links with other wireless nodes. MU-MIMO can beamform to multiple UEs simultaneously in a frequency and time block, e.g., a Resource Block (RB), i.e., using spatial multiplexing to provide capacity growth without the need of increasing the bandwidth. In a large-scale MIMO or massive MIMO system, a BS may be equipped with many tens to hundreds of antennas. In order for the BS to beamform to multiple UEs using the plural of antennas, the BS needs to know the DL channels to the UEs sufficiently accurately, e.g., the DL Channel State Information (CSI) of each UE. However, it is not efficient to obtain the DL CSI directly by sending reference pilots in the downlink because of two reasons: (1). The large number of antennas on the BS would cause large system overhead for reference signals in the downlink; (2). Dozens of bits are needed to quantize the CSI accurately, which causes overload of the feedback channel in the UL. Fortunately, the reciprocal property of an over the air wireless channel, such as in a Time-Division Duplexing (TDD) system or in a Frequency-Division Duplexing (FDD) system using switching to create channel reciprocity as described in our PCT application PCT/US14/71752 filed on Dec. 20, 2014, claiming the benefit of provisional patent application 61/919,032 filed on Dec. 20, 2013, can be employed to reduce the channel estimation overhead. In such a system, a UE sends a pilot signal, e.g., Sounding Reference Signal (SRS), which is received by all the antennas on the BS in the UL. The BS estimates the UL CSI through the received pilot signal and uses it to estimate the DL CSI based on channel reciprocity.

Although a MIMO BS with a large number of antennas can extend its DL coverage range through beamforming, the SINR of UEs can decay quickly as the distance between the BS and a UE increases, because UEs far away from the BS have significantly lower SINRs than UEs close to the BS due to large-scale fading, shadowing, and other factors. In addition, the UL range, and hence the UL channel estimation accuracy, is limited by the transmitting power of UEs. Before the BS knows the channels of the UEs, it is unable to perform beamforming. This application presents embodiments that use Amplify and Forward Relays (AFRs) to extend the coverage of a MIMO BS and perform multi-user beamforming using channel estimates that include relays. Note that the AFR also can be called Capacity Projector (CaP) or repeater.

In [1], B. Rankov and A. Wittneben described relay-assisted wireless MIMO channels for single-user MIMO (SU-MIMO) where the destination antennas are equally spaced in a linear array, and the relays are limited to single antenna nodes. The relays use TDD, i.e., receiving a data packet in one time slot and transmitting it in another time slot. This reduces the spectral efficiency and requires synchronization of the relays.

In [2], C.-B. Chae et al. described MIMO relaying with linear processing for multiuser transmission in fixed relay networks that is also TDD two-hop communication, same as in [1].

Our embodiments use many relays that are spatially distributed and the relays do not store the message in one time slot and forward in a second time slot. Instead, our relays are full duplexing, receiving, amplifying, and re-transmitting simultaneously.

In [3], W. Xu and X. Dong described a limited feedback design for MIMO-relay assisted cellular networks with beamforming, in which each UE is required to feed back its quantized CSI to the relay, and the relay sends the quantized beamforming vectors to the BS. In addition, it is limited to the oversimplified case of (Number of antennas of the BS)=(Number of antennas of the relays)=(Number of antennas of the UEs).

In [4], M. Andersson and B. Goransson described a MIMO system with repeaters that has the following limitations: (1). It is for SU-MIMO, not MU-MIMO; (2). Another fundamental limitation is that it is beam steering not beamforming, that is, it is limited to steering antenna lobes to aim towards an repeater or UE, instead of real beamforming, which is constructive alignment of radio waves along multiple paths at the receiver; (3). Furthermore, it is limited to each beam from the BS being steered to one repeater, so the antennas in the BS are not used to perform multi-user beamforming to the repeaters, (4). It requires the repeaters antenna lobe to be aimed at the UE, and "at least one antenna radiation lobe of the second antenna of at least one repeater is electrically controllable" to be steered towards the UE, which means the channel between the UE and the repeaters must be estimated and beam steering must be performed on the repeaters. This means that the BS is not beamforming to multiple UEs holistically via the repeaters, i.e., it is not treating repeaters as part of the total channel from the BS to UEs in beamforming computations at the BS. In another word, the BS is not directly beamforming to the UEs.

Instead, the steering of the beams is broken down to two stages, one stage is to steer a lobe from the BS to a repeater, and the second stage is to steer the lobe from the repeater to the UE. "The second antennas 24 of the repeaters 18, 19, 20, 21 then re-transmit the received respective information streams in such a way that the UE 12 now may have access to all four information streams." "If there is more than one UE 12 in the cell 2, the controllable 25,26,27,28 lobe may switch between the UEs 12."; (5). UE must have at least two antennas "the at least one repeater being arranged for communicating one of the MIMO communication streams to and/or from at least one UE (user equipment) the UE being equipped with at least two essentially uncorrelated antenna functions,"; and (6). The repeaters are not transparent to the BS and the BS requires the repeaters be arranged to communicate one of the BS communication streams to a UE. This means that the communication streams from the BS must be known a prior. In our invention, the communication streams from the BS are formed based on the total channel (TC) that includes one or more relays and one or more UEs, typically multiple relays and multiple UEs.

None of the prior art addressed the many technical challenges of a wireless network with MU-MIMO and a large number of relays widely distributed over a coverage area, including large number of antennas on the BS and relays, conditions and placement of full-duplex relays, efficient estimation of the TCs, and MU-MIMO beamforming using the TCs.

This invention presents significantly more advantageous solutions to dense networks using MU-MIMO and full duplex relays for both sub 6 GHz bands and for cm-wave and millimeter wave (mm-wave) bands. There is no prior art for efficiently extending the coverage of MIMO wireless nodes using relays as a method for densification of wireless networks.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Here after, a pilot signal may mean a signal transmitted by one antenna for the purpose of estimating the channel between the transmitting antenna and one or more receiving antennas. It may also be called a reference signal, a channel estimation signal or a test signal.

In the following descriptions, an antenna is used to indicate a RF path that includes the RF circuits and the antenna unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing.

Figure 1:
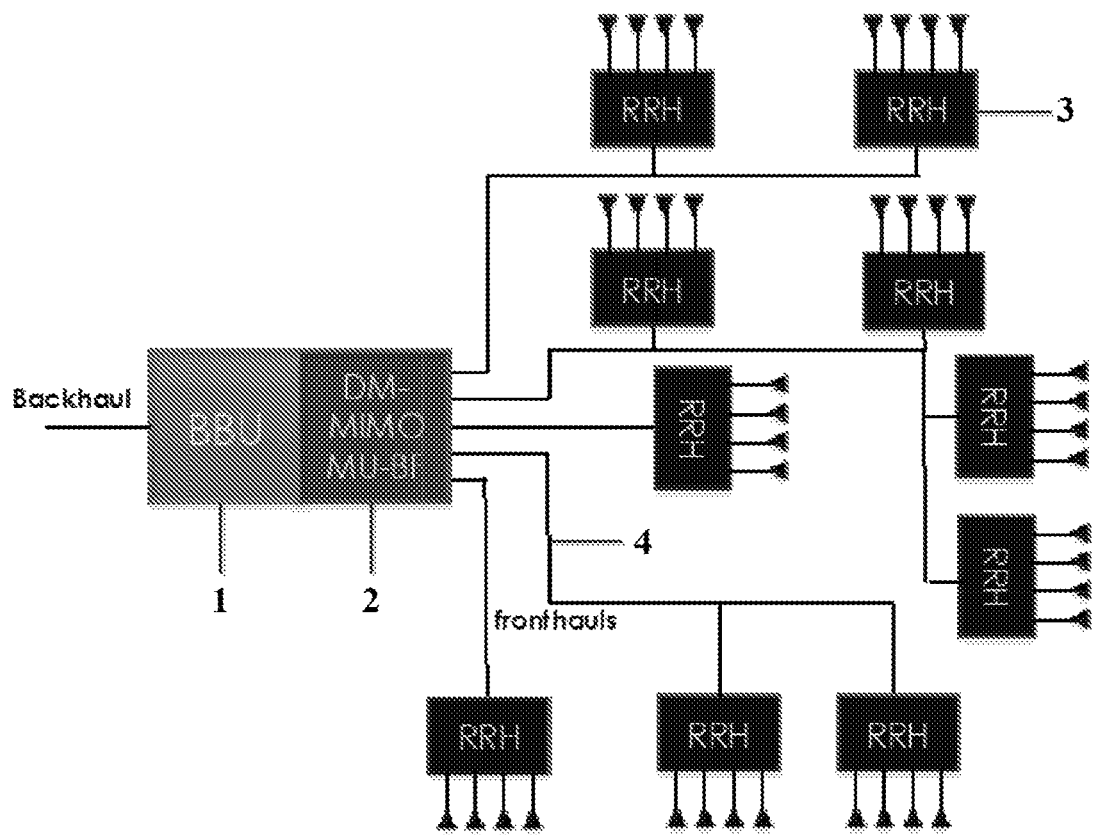
FIG. 1 shows the structure of a Distributed Massive MIMO (DM-MIMO) system.

One embodiment of this invention is a method for wireless network densification to provide higher throughput and higher spectrum efficiency than deploying dense small cells. The embodiment is referred to as Distributed Massive MIMO (DM-MIMO), as illustrated in FIG. 1, comprising of a central baseband unit (BBU) 1 supported by a multi-user beamformer (MU-BFer) 2 as well as a centralized backhaul, and a large number (many tens to hundreds) of Remote Radio Heads (RRHs) 3, each of which contains antennas, RF transceivers and sync circuits. They can be placed in places where small cells are placed or planned, or in other locations in the coverage area. Each RRH can have multiple antennas and all RRHs can transmit and receive in the same frequency bands for true "Frequency Reuse 1" in the entire area covered by all the RRHs. A RRH can be added to wherever improved coverage is needed, without requiring RF planning. Each RRH is connected to the central BBU via a fronthaul connection 4, which can be via an optical fiber, electrical cable or a wireless link. Either digital IQ samples or analog RF signals are carried over the fronthaul connections. In the case of sending digital IQ samples over a fronthaul connection, the central BBU sends a master reference clock signal via the fronthaul connection to all RRHs, each of which recovers the master reference clock signal and uses it to generate the local clock and carrier signal to ensure all RRHs use the same carrier frequency, referred to as frequency synchronization. In addition, the central BBU may also calibrate the time delay with each RRH and adjust it accordingly to ensure signals transmitted by all RHHs are synchronized in time. In one embodiment, the accuracy of time synchronization is relaxed as long as the time synchronization error is within the systems cyclic prefix, and the difference in delays among the RRHs are captured in channel model and taken care of in digital baseband processing. This reduces the cost and complexity of time synchronization on multiple RRHs. In another embodiment, synchronization of carrier phases among the multiple RRHs is not required. Instead, the carrier phase of each RRH is locked to its recovered master reference clock, e.g., using a Phase Locked Loop (PLL) circuit, thus the phase differences among the RRHs are fixed and are included in the channel model. As a result, these phase differences are handled in digital baseband.

Multi-user beamforming (MU-BF) is performed by the MU-BFer, e.g., using Zero-Forcing (ZF), Regularized-ZF (RZF), Minimum Mean Square Error (MMSE), Dirty-Paper Coding (DPC) or Conjugate Beamforming (CB), for antennas on all RRHs or clusters of RRHs to achieve a high order of spatial multiplexing over the entire coverage area with low inter-beam interference. The same frequency resource or the whole spectrum allocated to the BS can be simultaneously beamed to many UEs. When antennas in a cluster of RRHs (which may contain one or more RRHs, as long as a sufficient number of antennas are contained in the cluster) are used to perform MU-BF, it is referred to as Distributed MU-BF (DMU-BF). In one embodiment of DMU-BF, channel estimation or MU-BF using the same frequency resources are performed simultaneously for clusters of RRHs that are sufficiently far apart (relative to the transmitting power and large-scale fading), without worrying about interferences among the UE pilot signals or beams of different clusters because of their spatial separation by deployment. This embodiment is highly scalable, meaning that a large number of RRHs can be added to the DM-MIMO system to deploy over a coverage area so that the DM-MIMO system can beamform the same frequency resource or the whole spectrum allocated to the BS simultaneously to a very large number of UEs, e.g., tens to hundreds of UEs.

Multiple BBUs and their associated DM-MIMO systems can be deployed adjacently to cover a wider area. A DM-MIMO system can use additional antennas in overlapping coverage areas to make the transmissions by its RRHs to be orthogonal to the channels to the UEs in a neighboring DM-MIMO system to reduce the interference to the UE in the neighboring DM-MIMO system. A DM-MIMO system can obtain estimations of channels to UEs in a neighboring DM-MIMO system by listening to the pilot or reference signals transmitted by the UEs, and use the channel estimates to compute a pre-coding matrix to make the transmissions by its RRHs to be orthogonal to the channels to the UEs in a neighboring DM-MIMO system. This embodiment requires the multiple BBUs and their associated DM-MIMO systems to be synchronized.

DM-MIMO requires high speed fronthauls if digital IQ samples are transmitted via the fronthauls. The data rate on such fronthauls typically will be significantly higher than the data rate of backhauls for small cells. Alternatively, the fronthauls can transmit analog signals using RF-over-Fiber (RFoF). The digital fronthauls between the RRHs and the BBU can use star or cascade connections, or a combination as illustrated in FIG. 1. In an indoor environment, the cost of laying out fronthauls may be similar to the cost of laying backhauls to densely deployed small cells and may be acceptable in some applications. However, there are outdoor and some indoor environments where the cost of laying fronthauls is too expensive or impractical.

MU-MIMO Using Amplify and Forward Relays

Figure 2:
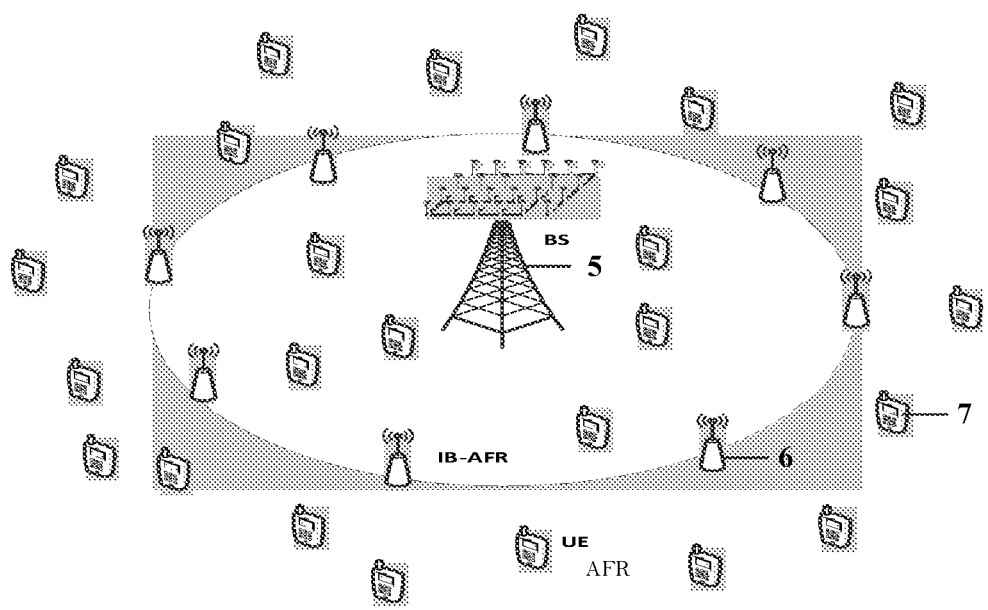
FIG. 2 shows a Centralized Massive MIMO (CM-MIMO) system with Amplify and Forward Relays (AFRs), each of which has one or more directional antennas facing one or more Base Stations (BS) (these antennas are referred to as BF antennas), and one or more directional antennas facing User Equipment (UEs) or one or more other AFRs in an area (these antennas are referred to as UF antennas).
Figure 3:
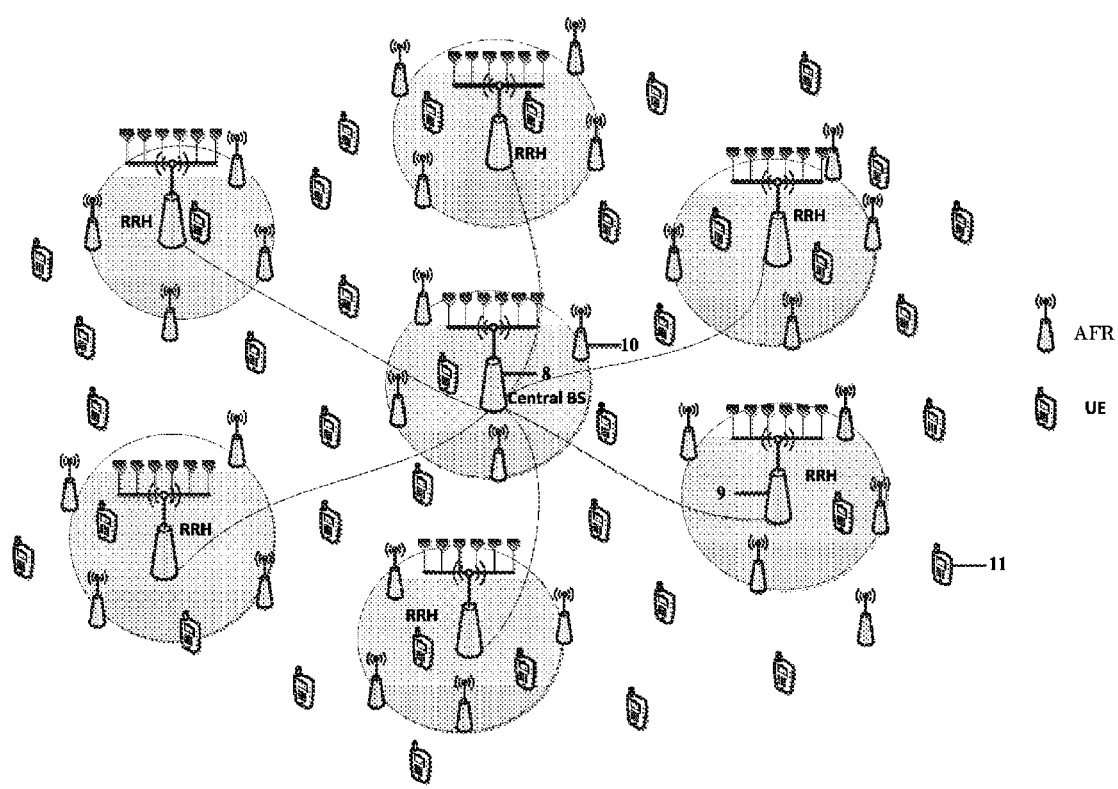
FIG. 3 shows the DM-MIMO systems with AFRs, each of which has one or more directional antennas facing one or more BS (referred to as BF antennas), and one or more directional antennas facing UEs or one or more other AFRs in an area (referred to as UF antennas).

Front-hauls, fiber, cable or wireless, can be expensive or difficult to deploy in some cases. This invention includes embodiments of MU-MIMO wireless network using AFRs that alleviate the need of wired or wireless backhaul or fronthaul to a large number of small cells or RRHs. AFR can be employed either in conventional commercial wireless communication systems, e.g., LTE/LTE-A or the evolution systems, WiFi with frequency band from several hundred MHz to 10 GHz or in the mm-wave communication systems with frequency band larger than 10 GHz or even over 100 GHz. One embodiment comprises of using a MU-BFer and a plural of AFRs deployed over a coverage area, as illustrated in FIG. 2. Note that the antennas of the MU-BFer may be closely located with sufficient inter-antenna separation, e.g., more than $\lambda/2$ where $\lambda$ is the wavelength of the carrier, referred to as Centralized Antenna MIMO-Relay Architecture (CAMRA) embodiment (FIG. 2), where the centralized BS 5, at the help of relays 6, covers many UEs 7 at the same resource element simultaneously; or the antennas may be distributed to a few locations as shown in FIG. 3, referred to as Distributed Antenna MIMO-Relay Architecture (DAMRA) embodiment, where the central BS 8 connected to multiple Remote Radio Heads (RRHs) 9 via front-haul, with the help of multiple relays 10, covers UEs 11 located in a very large area. The following descriptions apply to both CAMRA and DAMRA. each AFR has $N_{BF} \geq 1$ antennas (referred to as BF antennas) with a directional beam pattern facing the MU-BFer and $N_{UF} \geq 1$ antennas (referred to as UF antennas) with a directional beam pattern facing UEs or downstream AFR(s), preferably $N_{UF} \geq N_{BF}$. The embodiment further comprises of estimating the channels between UEs and MU-BFer with the AFRs in place, referred to as TC estimates; using the channel estimates of the TCs to compute precoding matrices or detection matrices; and using the precoding or detection matrices to perform beamforming to transmit data to or receive data from multiple UEs using the same frequency resources, whereas MU-BF can use any known or future MU-BF method, e.g., ZF, RZF, CB, MMSE, DPC, etc.

One feature of mm-wave wireless system is strong directivity. Power efficient communication requires the beam directions of BS, relays and UEs are matched. However, a detection stage is needed to find the directions so that the beam directions can be matched. One embodiment comprises a MU-BFer capable of forming and directing B beams; a set of AFRs each of which provides more UF beams than BF beams and the total of UF beams R on all the AFRs is more than the number of beams of the MU-BFer, i.e., R>B and typically R>>B; the MU-BFer forming and directing D beams towards a subset of AFRs that are serving K active UEs in the current time slot, where $B \geq D \geq K$. Having more UF beams than BF beams on an AFR not only extends the beams from the MU-BFer but also broadens their coverage and increases the multipath-richness of the mm-wave channel, thus increasing the robustness of the mm-wave links due to limitation of directivity and blockage of LOS, and increasing the rank of the MU-MIMO channel matrix, hence the capability to perform MU-MIMO using the D beams with the K UEs. The embodiment may further comprise selecting and transmitting or receiving the beam(s) on an AFR that is (are) directed towards active UE(s) in the current time slot, and switching off the other beams to save power or concentrating power to the selected beams. The selection of the beams and switching on or off of the DL or UL paths may be performed by the AFRs, or performed at the MU-BFer and communicated to AFRs via commands through a control channel.

Furthermore, antennas of the MU-BFer can be distributed, similar to DM-MIMO as in FIG. 3, and AFRs are deployed in the area of each distributed site of antennas of the MU-BFer. In one embodiment, a subset of the distributed RRHs and the associated AFRs are used to perform MU-MIMO beamforming, i.e., a channel matrix that only includes the channels of the subset of RRHs, AFRs and selected UEs are used in computing the precoding or detection matrix by the MU-BFer to beamform to the selected UEs. This is done independent of what the other RRHs are doing. When two or more subsets of RRHs and AFRs are located in areas that have a high degree of RF separation, this is, the path loss of RF signals from RRHs and AFRs, hence UEs, in one subset to another subset is large, e.g., −20 dB (referred to as RF disjoint subsets), the two or more subsets perform MU-MIMO beamforming independently and simultaneously using the same frequency resources. Furthermore, a group of RF disjoint subsets perform MU-MIMO beamforming independently and simultaneously using the same frequency resources at time slot 1, and another group of RF disjoint subsets perform MU-MIMO beamforming independently and simultaneously using the same frequency resources at time slot 2. The two groups may overlap, meaning that some RRHs and AFRs may belong to more than one group. This is spatial and time division of DM-MIMO with AFRs, alleviating the problem of pilot contamination in channel estimation and reduces the computational load for beamforming by reducing dimensions of the channel matrices.

In MU-MIMO beamforming, uncorrelated channels are strongly preferred as they lead to low condition numbers of the channel matrix and higher capacity. However, in a MU-MIMO system with AFRs, when many nearby UEs are crowded into an area, e.g., large crowds in stadiums, live events, etc., some MU-MIMO channels are highly correlated. One embodiment is a method of user grouping to improve beamforming in a MU-MIMO system with AFRs comprising calculating correlations of the TCs of different UEs, where a TC includes the paths through the AFRs; selecting UEs with low channel correlation into a group; allocating frequency resources to the group of UEs; computing precoding and/or detection matrix using channel matrix of the UEs in the group on the allocated frequency resources; and perform MU-MIMO beamforming with UEs in the group on the allocated frequency resources. Furthermore, UEs that are to be served at the same time slot may be divided into two or more such groups, each of which is allocated a part of the available frequency resources.

In a MU-MIMO system with AFRs, the variance of delay spreads of TCs with different UEs can be larger than the delay spreads of channels in a system without AFRs. A larger delay spread corresponds to a short coherence bandwidth, thus requires computation of precoding and/or detection matrix on a larger number of frequency resource blocks or subcarriers. If TCs with shorter delay spreads and with larger delay spreads are mixed together in MU-MIMO beamforming, precoding and/or detection matrix must be computed on the finer resolution of frequency resource blocks or subcarriers demanded by the TCs with larger delay spreads. This wastes computation resources by performing unnecessary computations on smaller frequency resource blocks or group of subcarriers for TCs that have larger coherence bandwidth, and/or reduces the number of UEs that can be simultaneously served on the same frequency resources due the size of the matrices that can be processed in the allowed time by the hardware. TCs with larger coherence bandwidth only need computation of precoding and/or detection matrix on a small number of frequency resource blocks. One embodiment is a method of user grouping for efficient MU-MIMO beamforming computation when AFRs are present comprising estimating the delay spreads or coherence bandwidth of the TCs of different UEs; selecting UEs whose TCs have similar delay spreads or coherence bandwidth into a group; allocating frequency resources to the group of UEs; computing precoding and/or detection matrix using channel matrix of the UEs in the group on the allocated frequency resources; and perform MU-MIMO beamforming with UEs in the group on the allocated frequency resources. Furthermore, UEs that are to be served at the same time slot may be divided into two or more such groups, each of which is allocated a part of the available frequency resources.

User grouping and frequency allocation also need to consider other UE TC conditions when AFRs are present, i.e., Channel Quality Information (CQI), Channel Estimation Error (CEE), and UE Speed Indication Information (SIT). Methods for user grouping and frequency resource allocation in MU-MIMO systems without AFRs was described in the Provisional Patent Application entitled "Frequency Resource Allocation in MU-MIMO Systems", 61/968,647 filed on Mar. 21, 2014. When AFRs are present in a MU-MIMO system, one embodiment estimates the TC parameters, including but not limited to, correlations, delay spreads or coherence bandwidth, CQI, CEE and SII of the TCs of different UEs; selecting those UEs into a group based on their TC parameters such that it improves system performance when AFRs are present, including but not limited to, improved MU-MIMO beamforming, increased system throughput, reduced computational load, reduced power consumption; allocating frequency resources to the group of UEs; computing precoding and/or detection matrix using TC matrix of the UEs in the group on the allocated frequency resources; and perform MU-MIMO beamforming with UEs in the group on the allocated frequency resources with AFRs present. Furthermore, UEs that are to be served at the same time slot may be divided into two or more such groups, each of which is allocated a part of the available frequency resources.

Because of the high directivity of mm-wave, prior art had difficulty in achieving MU-MIMO when UEs are located closely together. One embodiment comprises closely located UEs communicating using a Device to Device (D2D) short-range (e.g., less than 1 meter) wireless link to coordinate the direction of each UE's transmitting and/or receiving beam, such that the UEs tune their transmitting and/or receiving antenna beam directions to facilitate MU-MIMO communication with the multiple beams from a MU-BFer and/or one or more AFRs. Through the D2D wireless link among closely located UEs, the UEs can each select a transmitting and/or receiving antenna beam direction such that each can aim at a distinct beam from a MU-BFer or one ore more AFRs or each can have an uncorrelated channel to allow beamforming using zero forcing or other methods. After the closely located UEs select their distinct transmitting directions, the UEs can use directed beams in their selected directions to transmit UL signals to AFRs which are abundantly distributed and can receive in many directions in a discovery receiving mode. The AFRs can then amplify the received UL signals from the UEs and forward the signals to the MU-BFer. The MU-BFer can then transmit DL signals to the UEs by beam form to follow the path that is the reverse of the UL path from the UEs while the UEs remain in the same selected antenna beam directions.

In another embodiment, the DL path from a BF antenna port to a UF antenna port and/or a UL path from a UF antenna port to a BF antenna port is equipped with circuit element(s) whose parameter(s) can be adjusted to change the DL and/or UL transfer function of a RF path in an AFR, and the parameters are chosen to create a channel matrix that is conducive to MU-MIMO.

Another embodiment of AFRs is a wireless network comprising one or more mm-wave MU-BFers to provide wireless backhauls to small cells; a set of AFRs working in conjunction with the mm-wave MU-BFer(s); and a set of small cells operating in a different carrier frequency than the wireless backhaul, whereas the AFRs are used to extend the coverage of the MU-BFer(s), to overcome the lack of Line-Of-Sight (LoS) between the MU-BFer(s) and the targeted small cell(s), to increase the robustness against the blockage of LoS from the MU-BFer(s) to the targeted small cell(s), and/or to increase the multi-path richness of the channel between the MU-BFer(s) and the targeted small cell(s).

Prior arts require relays in a network to be synchronized in time and frequency with the BS, which can become costly especially when there are a large number of relays in the network. It is important to note that embodiments of this invention can work without requiring time nor frequency synchronization of the AFRs with the BS. It is also important to note that in some cases, the existence of the AFRs can be made transparent to the MU-BFer and the UEs in the estimation of the TCs and in performing beamforming because the effects of the AFRs are captured in the estimates of the TCs. The TCs are a superposition of the natural passive channels and the new channels introduced by the AFRs, which function as active channels. Enough RF signal processing delay should be reserved in the Guard Period (GP) of TDD frame to avoid the collision of DL and UL signals. In one embodiment, the GP is designed as the time in the traditional TDD system plus the total delay introduced by the AFRs in the TC. In the case of multiple relay hops, the total delay is the sum of the delays of all hops. One embodiment comprises designing AFRs with delays such that delays with the AFRs are shorter than cyclic prefix in an OFDM system, and shorter than allowed GP.

Placement and Organization of AFRs

The placement of the AFR for a given specific BS or RRH includes the number of BF and UF antennas of AFRs, the number, the location, and the beam pattern of AFR, which are determined by the application scenario, e.g., the number of transmit antennas of a BS or RRH, the maximal number of UEs K multiplexed on a resource block, the maximal transmitting power and the coverage area of a BS or RRH, etc.

For the number of AFRs $N_{AFR}$, in a preferred embodiment, it should satisfy the condition $K \leq \min(\Sigma_{i=1}^{N_{AFR}} N_{BF}^i, \Sigma_{i=1}^{N_{AFR}} N_{UF}^i)$ so that the rank of the channel matrix on each MU-MIMO user group is not smaller than K because of the introduction of AFRs into the channels, where $N_{BF}^i$ and $N_{UF}^i$ are the numbers of BF and UF antennas at the ith AFR respectively.

In another embodiment, AFRs can be placed to improve the signal strength of certain targeted areas. In this case, the number of UEs served in the same resource block in a targeted area $\tilde{K}$ should satisfy the condition $\tilde{K} \leq \min(\Sigma_{i=1}^{N_{AFR}} \tilde{N}_{BF}^i, \Sigma_{i=1}^{N_{AFR}} \tilde{N}_{UF}^i)$, where $\tilde{N}_{BF}^i$ and $\tilde{N}_{UF}^i$ denote the number of BF and UF antennas for the ith AFR respectively in the targeted area, so that the rank of the channel matrix on each MU-MIMO user group is not reduced because of the introduction of AFRs into the channels.

For the number of BF and UF antennas, the maximal space degree of freedom (DoF) is upper-bounded by the minimal of the number of MU-BFer antennas, total UF and BF antennas. To avoid DoF reduction, in a preferred embodiment, the following condition should be satisfied $$\min\{\Sigma_{i=1}^{N_{AFR}} N_{BF}^i, \Sigma_{i=1}^{N_{AFR}} N_{UF}^i\} \geq M.$$

Let the coverage radius or distance be $R_{tx}$, given the maximal transmit power $P_{Tx}$ of a BS or RRH, then the AFR can be located where the distance between the BS or RRH and the AFR is smaller than $R_{tx}$, i.e. $\alpha R_{tx}$, where $0 < \alpha < 1$. Moreover, the value of $\alpha$ and the amplification gain of AFR are determined by the actual coverage radius of a BS or RRH and $P_{Tx}$. In one embodiment, the distance $\alpha R_{tx}$ is chosen to be sufficiently close such that there is no loss or almost no loss of SNR in the signal received by the AFR.

For the BF antenna of AFR, since they only communicate with the BS or RRH or another AFR with fixed location, it should be designed that its field pattern has a very narrow beam pointing to the fixed location. In one embodiment, a BF antenna of AFR consists of several to tens of antenna elements, e.g., dipoles, and may further include one or more reflectors to produce a narrow beam in a desired direction, i.e., pointing towards a BS or RRH.

For the UF antennas of AFR, their designs depend on the frequency band.

Figure 4:
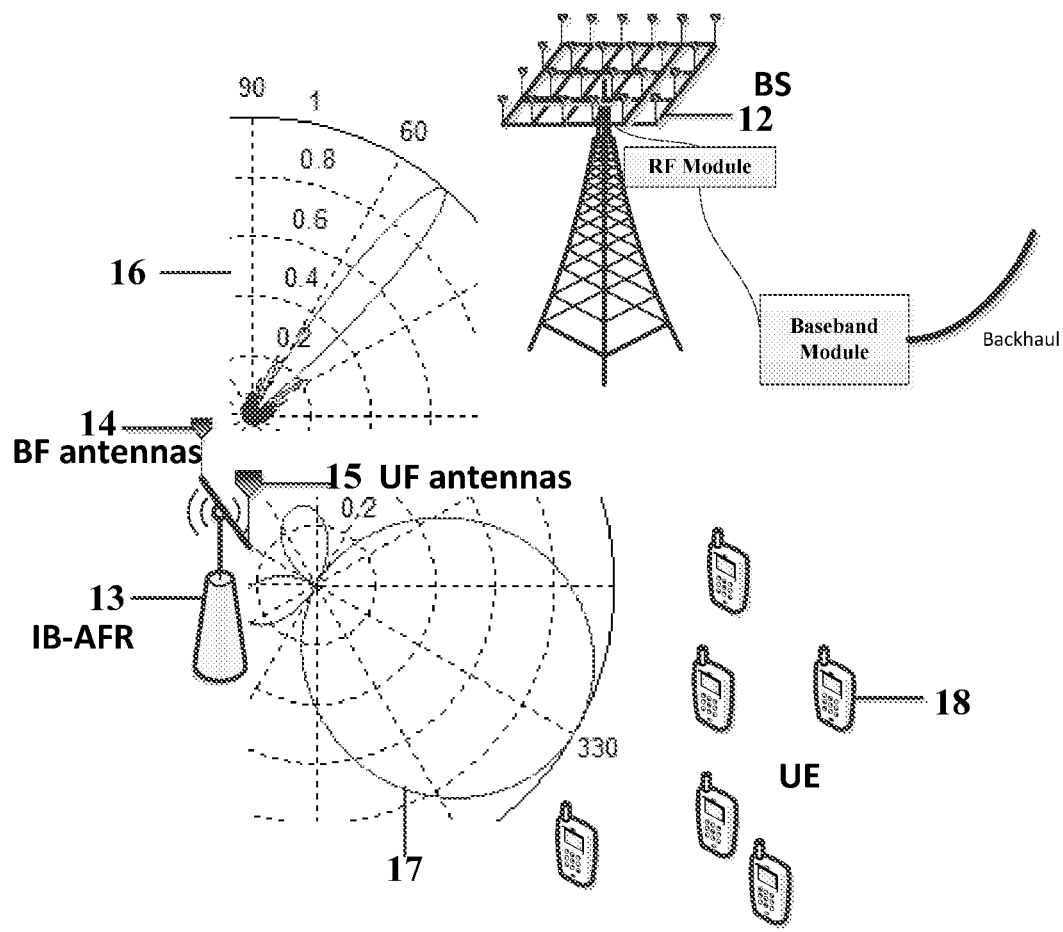
FIG. 4 shows a beam pattern of BF and UF antennas in a system with frequency band lower than 10 GHz.

For the systems with frequency band lower than 10 GHz, the beam width of antenna can be relatively large, e.g., the 3 dB beam width is about 60 degree which can be easily implemented by a dipole with a reflector, so that each UE can receive multiple scattered signals from the same antenna because of the transmission feature of RF signals below 10 GHz and thus the condition number of the MU-MIMO channel matrix is reduced. One embodiment is shown in FIG. 4. The BS 12 is equipped with an AFR 13 to project its capacity to the weak signal area. The AFR is equipped with a signal BF antenna 14 and a single UF antenna 15 with antenna patterns 16 and 17 respectively. When an AFR has multiple UF antennas, the beams of these antennas may point to the same direction to avoid causing too large multi-path delay spread to a UE.

Figure 5:
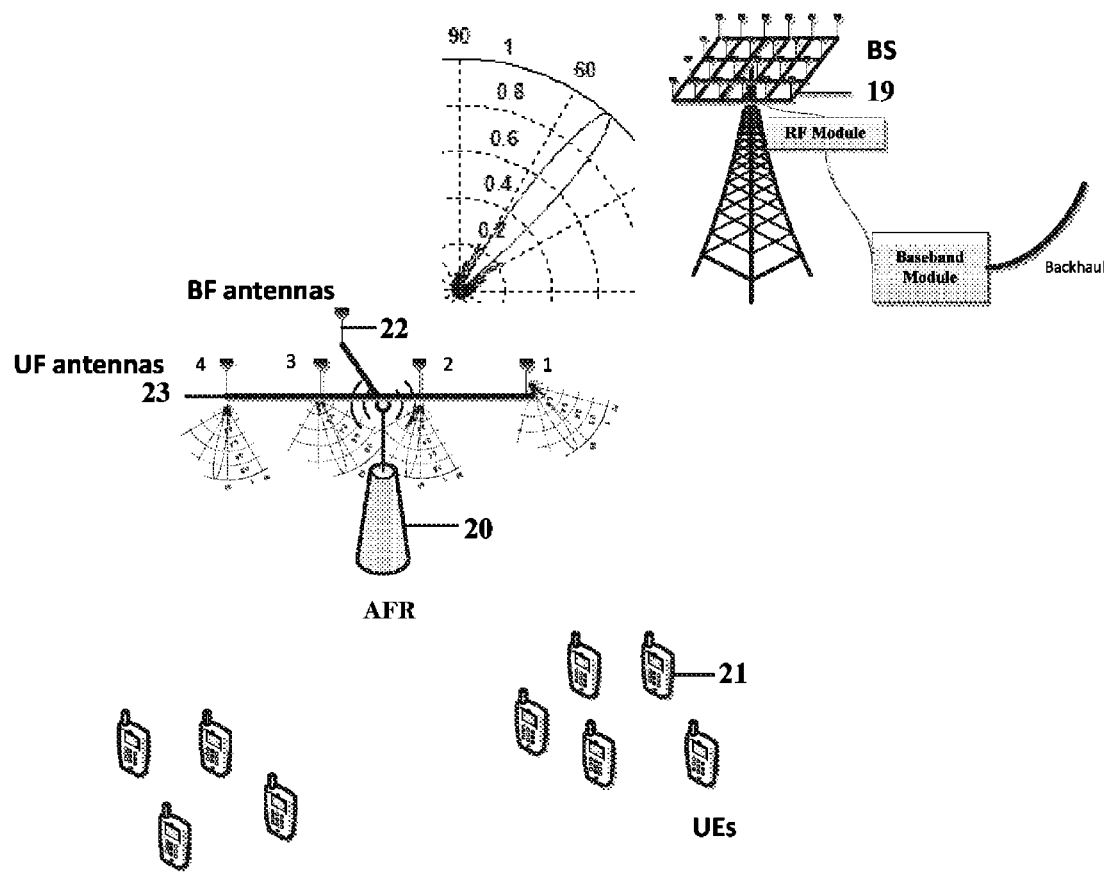
FIG. 5 shows a beam pattern of BF and UF antennas in a mm-wave communication system, where each BF and UF antenna may be an array of antenna elements configured to form a beam pattern.
Figure 6:
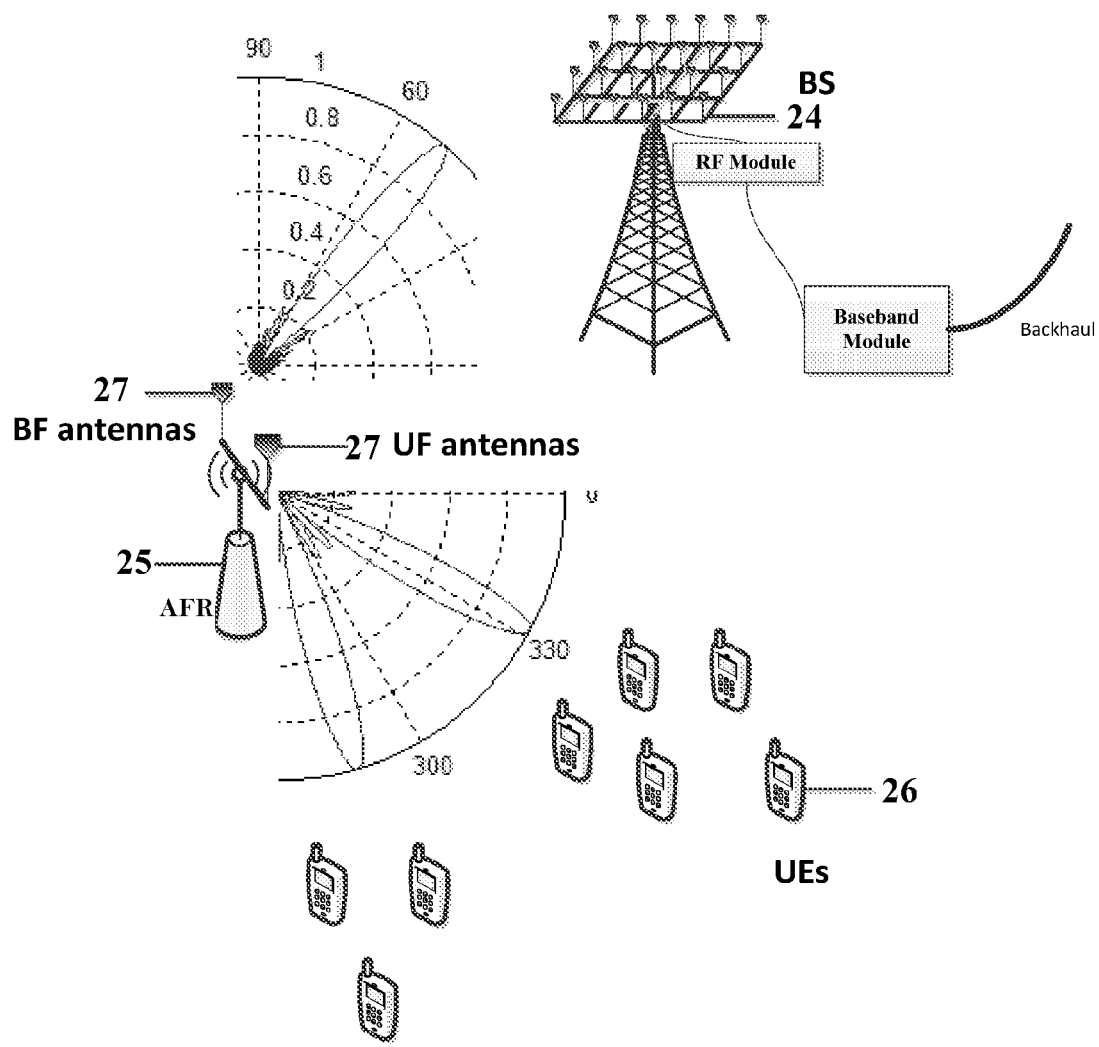
FIG. 6 shows another beam pattern of BF and UF antennas in a mm-wave communication system, where each BF and UF antenna may be an array of antenna elements configured to form a beam pattern.
Figure 7:
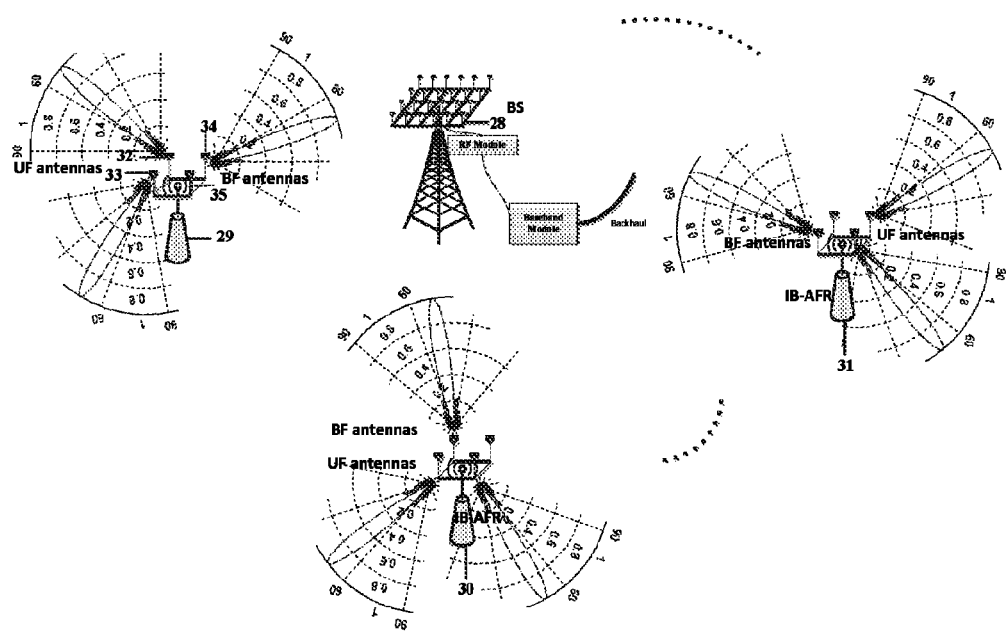
FIG. 7 shows an organization of the beams of AFRs in a mm-wave communication system, where each BF and UF antenna may be an array of antenna elements configured to form a beam pattern.
Figure 8:
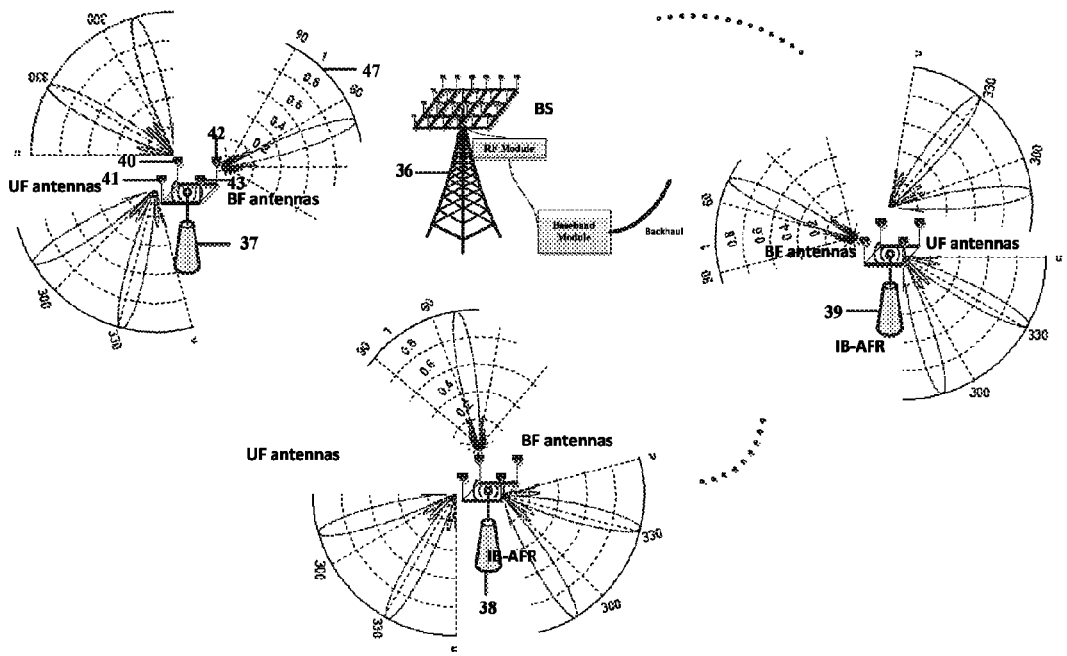
FIG. 8 shows another organization of the beams of AFRs in a mm-wave communication system, where each BF and UF antenna may be an array of antenna elements configured to form a beam pattern.

In an embodiment using mm-wave frequency bands, AFRs are placed to provide segmented LoS link with UEs that are in the Non-Line-of-Sight (NLoS) link of BS. A segmented LoS link is formed by having LoS of link between BS and an AFR and between the AFR and a UE. When there is no LoS path between the BS and UEs in a coverage area, one or more AFRs can be placed in locations and the direction and/or beam pattern of the AFR's antennas can be configured such that there is a LoS path between the BS and the AFR and there is a LoS path between the AFR and UEs. Furthermore, AFRs are placed and their antennas can be configured to increase multipath richness to increase robustness (in case a LoS path is blocked, and to increase multipath) and to increase DoF for MU-MIMO beamforming in a mm-wave system. Embodiments of antennas of AFR in mm-wave frequency bands include requirement of the beam width and/or beam pattern of each antenna and the arrangement of the beam directions of the antennas of one or more AFRs. Note that where each BF and UF antenna may be an array of antenna elements configured to form a beam pattern with one or more highly directive main lobes. For the beam width and pattern, one embodiment is one narrow beam per antenna, e.g., FIG. 5 shows an embodiment of a BS 19 with an AFR 20 to cover UEs 21, where the AFR 20 has a single BF antenna 22 and 4 UF antennas 23, where antennas 1 and 3 point to one direction while antennas 2 and 4 point to another direction. Another embodiment uses a single antenna, e.g., an array of antenna elements, to produce several narrow beams pointing to different directions, e.g., FIG. 6 shows an embodiment of a BS 24 with an AFR 25 to cover UEs 26, where the AFR has a single BF 26 and a single UF antenna 27 that produces multiple beams. The UF antenna has two main beams pointing two different directions. In both embodiments, when an AFR has multiple antennas, each antenna may have the same beam pattern but pointing to a different direction at a different time slot. This is very important for a mm-wave system so that each UE can receive multiple signals from several AFRs from different directions. As a result, even two closely located UEs can be separable and multiplexed in a MU-MIMO group because all these AFRs equivalently provide sufficient multipath links to each UE from different directions of MU-MIMO beamforming. Moreover, with multiple AFRs, the system is more robust against shadowing or blockage. FIG. 7 shows an embodiment a BS 28 with multiple AFRs, e.g., 29, 30, 31, to implement capacity projection, where each AFR has two or more UF antennas 32, 33, each of which produces a narrow beam pointing to a different direction, and a single BF antenna 34, 35. FIG. 8 shows an embodiment a BS 36 with multiple AFRs, e.g., 37, 38, 39, to implement capacity projection, where each AFR has two or more UF antennas 40, 41, each of which produces two or more narrow beams pointing to a different direction, and two BF antennas 42, 43. In both examples, each UE may be covered LoS and/or multipath signals from several AFRs.

The beam pattern of UF antenna can be adaptive according to the specific requirement. In one embodiment, an AFR has directional antennas that are steerable or switchable, and the directions of the antennas are steered or switched on/off (both referred to as steered hereafter) based on the distribution of the UEs in the coverage area. The embodiment may further comprise a self-organizing process that steers the antennas of one or more AFRs based on the number and spatial distribution of UEs that are scheduled to communicate with the BBU. In one embodiment, the self-organizing decisions, i.e., which direction an AFR's antenna will be steered towards to meet one or more objectives, including but not limited to, rank of the channel matrix, condition number of the channel matrix, desired throughput and priority of each UE, desired modulation order and coding or SINR of each UE. Furthermore, the decision is made using information including but not limited to the estimates of channels, e.g., the TCs, of the UEs, estimations of the locations of the UEs. The said self-organizing decision may be made at the central processor, e.g., the MU-BFer or BBU, or locally by each AFR. When the decision is made at the central processor, it can be communicated to the AFRs through a control channel.

This invention also includes embodiments for reducing network power consumption in a MU-MIMO system with one or more MU-BFers. In one embodiment, AFRs are turned on or off based on UE distribution based on estimation of how much they contribute to the increase of SINR of UEs or increase the delay spread, so AFRs that do not make appreciable positive contributions are switched off, or partially switched off (e.g., some DL RF paths are switched off) to save power and/or improve system performance. More generally, one power saving embodiment of a MU-MIMO system, with or without relays, comprises selecting the number of RF paths and/or antennas in a MU-BFer based on the number of UEs, SINR needed to support the desired modulation and coding scheme (MCS), channel estimation, so that just a sufficient number of RF paths and/or antennas (smaller than the total number available) are employed to meet the requirement.

The embodiment of selectively turning on or off AFRs can also be extended to re-distribute the capacity of a MU-BFer to different coverage areas. One embodiment comprises selectively turning on or off AFRs in some locations to re-distribute a MU-BFer's beams to different coverage areas based on traffic demand, to a first area at a first time period, e.g., a stadium in evening when there is a sport game, or to a second area at a second time period, e.g., to an office building or shopping mall during the day. Some or all of the AFRs for covering the second area will be switched off when the traffic demand from a first area is high. Another embodiment comprising using mobile AFRs to re-distribute the capacity of a MU-BF, i.e., place AFRs on mobile platform, e.g., vehicles, and locate the vehicles, hence the AFRs, to increase the signal strength of the beams from the MU-BFer to an area that otherwise has poor coverage from the MU-BF, e.g., placing mobile AFR(s) in the vicinity of a sport stadium or concert site to move the capacity from one or more far away BSs when there is a game or live event.

In one embodiment, an AFR capable of producing multiple simultaneous UF beams, for either transmitting DL to UE or receiving UL from UE, turns on or off a UF beam based on the existence or absence of UEs in the coverage area of the UF beam. The AFR detects the existence of UE in the coverage area of a UF beam using the strength of UL signal it receives on the UF beam. If no UL signal of sufficient strength is received on a UF beam in a UL time slot, the AFR turns off the UF beam, and the associated amplifying path, in the immediate or certain number of subsequent DL time slot. Furthermore, in either UL or DL, an AFR can keep its amplifying in a power conservation mode, use a receiving signal power detector circuit to detect incoming signal on a BF or UF beam, activates the associated amplifying path and amplify and forward the signal when an incoming signal of sufficient strength is detected. The detection and activation are completed in a short period of time, e.g., sufficiently shorter than the cyclic prefix in an OFDM signal, thus, allowing effective amplify and forward with power saving. In another embodiment, the UL amplifying path of some or all beams in an AFR is turned on at some time slots to detect UL signaling from UE, and the AFR uses the received signal strength in such time slots to decide whether to put some or all of its DL and/or UL amplifying paths into a power saving state. Such time slots are known to the BS and the UEs. For this purpose, the AFR needs to be synchronized to the BS. It can do so by detecting a synchronization signal or reference clock broadcast over the air.

In yet another embodiment, an AFR is placed at a location where it does not reduce the SNR of the transmitted signal. To achieve this, after a signal is amplified by an AFR, the raised noise level due to the noise figure of the AFR should be less or equal to the noise level in the transmitted signal. Equivalently, the noise level of the signal received by the AFR should be above the noise floor of the AFR by at least the noise figure of the AFR.

Acquiring Estimation of TCs

The methods to acquire estimation of the TCs depend on the specific application scenario. One typical application is that the number of antennas at the MU-BFer is comparable to the number of UEs served simultaneously. For example, in a hybrid beamforming system, especially in a wireless system using cm-wave or mm-wave frequency bands, e.g., from 10 GHZ to 150 GHz, a plural of number of antenna elements are connected to a single RF path and all antenna elements connected to a single RF path are treated as a single antenna in the baseband. Analog beamforming is first performed on the antenna elements connected to a single RF path. Then, digital beamforming in the baseband is performed on, thus requiring channel estimations on, the much smaller number of RF paths. No matter what duplexing mode is employed in this system, e.g., TDD or FDD, the UL and DL TCs can be measured independently.

To estimate the UL TC from a UE to the MU-BFer, a UE sends a pilot signal. The TCs of multiple UEs can be estimated simultaneously by having the multiple UEs send orthogonal pilot signals. The BBU uses the received pilot signal to estimate the UL TCs.

To estimate the DL TC from the MU-BFer to a UE, an antenna on the MU-BFer sends one or more pilot signals. The TCs of multiple antennas on the MU-BFer to a UE can be estimated simultaneously by having the multiple antennas send orthogonal pilot signals. The UE uses the received pilot signal(s) to estimate the DL TC. The DL TC estimate can then be fed back to the BBU using UL data transmission from UEs to BBU or dedicated uplink control channels, e.g., the channel matrix can be quantized to a predefined codebook and its corresponding index is fed back to the BBU. One advantage of this method for DL TC estimation is that it does not depend on reciprocity of the DL and UL over-the-air (OTA) channel, nor the symmetry of the DL and UL transfer functions of the AFRs.

One embodiment of a MU-MIMO wireless system or communication method, as shown in FIG. 1, comprises one or more BSs, each with a large number of antennas, whereas the antennas of a BS may be arranged in a single array with antenna separations from half wavelength to several wavelengths, or in multiple sub-arrays whereas the sub-arrays are distributed over an area; a number of AFRs distributed over the coverage area(s) of the one or more BSs, preferably placed in locations where the signals from the BS(s) are weak; having each antenna on the BS transmit pilots signals to a plural of UEs for the UEs to estimate the DL TCs that include the AFRs, where multiple antennas on the BS may transmit orthogonal pilot signals simultaneously to reduce the time needed for channel estimation; the UEs feeding back to the BS the estimation of the BS to UE DL TCs using UL transmission; the BS computing the TC beamforming matrix; and the BS sends UE specific data simultaneously to multiple UEs on each resource block using MU-MIMO beamforming by applying the TC beamforming matrix.

However, for the systems where the number of antennas at the MU-BFer is much larger than that of the simultaneously served UEs, the method in the above paragraph is no longer desirable because of its costly pilot and feedback overhead to the systems. Due to this reason, two possible solutions are provided in the next two sections to acquire TCs in the large-antenna systems.

Symmetrical AFR for Reciprocal DL Channel Estimation

It is known that in a TDD network, UL pilot signals from a UE can be used to obtain the estimate of the DL channel based on the channel reciprocity of the OTA channel. Using UL pilot signals to estimate DL channel has a complexity that is scaled with the number (referred to as K) of UEs or total antennas on UEs served in a given resource block. This is in contrast to the complexity scaling with the total number of antennas M on the ME-BFer, which can be significantly larger than K.

The non-symmetric portion of the channel, e.g., the transmitting (Tx) and receiving (Rx) paths of the UE and MU-BFer, can be calibrated using various method, e.g., a relative calibration procedure, e.g., [5]. This reciprocity property can also be used to estimate DL channel from UL pilot signaling in an FDD network, as described in our PCT application PCT/US14/71752 filed on Dec. 20, 2014.

Because of the existence of the AFRs, the reciprocity of OTA channel is affected by the DL and UL transfer functions of the AFRs. One embodiment is an apparatus of or a method for a Symmetrical AFR (SAFR) comprising of a DL path from a BF antenna (or antenna port) to a UF antenna (or antenna port); a UL path from a UF antenna (or antenna port) to a BF antenna (or antenna port); building both with closely matched or identical components, and adjusting parameters of one or both paths such that the transfer function of one path closely matches that of the other path, where the transfer function is defined as the Fourier transform of the signal emitted by a first antenna or delivered to the port of a first antenna due to the signal impinging upon a second antenna or entering the port of a second antenna divided by the Fourier transform of the signal impinging upon the second antenna or entering the port of a second antenna, namely the symmetry condition is $$h_{DL}(\omega) = \frac{s_{DLout}(\omega)}{s_{DLin}(\omega)} \approx \frac{s_{ULout}(\omega)}{s_{ULin}(\omega)} = h_{UL}(\omega)$$

where $h_{DL}(\omega)$ and $h_{UL}(\omega)$ are the transfer function of the DL path and the UL path of the AFR respectively, $s_{DLin}(\omega)$ and $s_{ULin}(\omega)$ are the Fourier transforms of the DL and UL signals received by the AFR respectively, and $s_{DLout}(\omega)$ and $s_{ULout}(\omega)$ are the Fourier transforms of the DL and UL signals emitted by the AFR respectively. Note that in implementation, the channel matrices and transfer functions are only estimated at some frequencies. So ($\omega$) in all equations is understood as $\omega \in \{\omega_i, i=0, 1, 2, \ldots, P\}$ where $\omega_i$ are sampling points on the frequency axis, e.g., subcarriers.

One embodiment comprises using symmetrical AFRs; estimating the DL TCs with the symmetrical AFR(s) in place by having one or more UEs transmitting UL pilot signal(s), MU-BFer using the received pilot signal(s) to estimate the OTA TC from a UE to the MU-BFer, and using this estimate as the estimate of the OTA channel from the MU-BFer to the UE. Furthermore, after the BS to UE DL channels are estimated, the BS can use the TC matrix to compute the pre-coding matrix to beamform to the UEs, with the effect of the AFRs included in the beamforming. Therefore, one embodiment of a MU-MIMO wireless system or communication method, as shown in FIG. 1, comprises one or more BSs, each with a large number of antennas, whereas the antennas of a BS may be arranged in a single array with antenna separations from half wavelength to several wavelengths, or in multiple sub-arrays whereas the sub-arrays are distributed over an area; a number of AFRs distributed over the coverage area(s) of the one or more BSs, preferably placed in locations where the signals from the BS(s) are weak; having each UE transmitting pilots signals to a BS for the BS to estimate the UL channels; the BS using the estimation of the UL channels to compute an estimation of the DL TC from the BS to the UEs; the BS computing the TC beamforming matrix; and the BS communicating with multiple UEs simultaneously on each resource block using MU-MIMO beamforming by applying the TC beamforming matrix.

Due to fabrication process variations, circuit board manufacturing precision tolerances, etc., a practical AFR may not have perfect symmetrical DL and UL paths. This imperfection can be compensated by the carefully designed circuit plus some references signal transmissions. Alternatively, an AFR can be designed to be intrinsically symmetrical, which we will present in a separate patent application.

DL Channel Estimation with Non-Symmetrical AFR

It may be difficult to make all AFRs symmetrical over the entire bandwidth of interest, especially when the bandwidth is very wide, e.g., one or more GHz. One embodiment is an efficient method for estimating the DL channel when the AFRs are non-symmetrical, without using DL pilots and feedback and without requiring an AFR to perform channel estimation. An embodiment using one hop relays is described below. Each AFR performs calibration to find its DL path transfer function $h_{DLi}(\omega)$, defined as the ratio of the Fourier transform of the signal out of the UF antenna port over the signal into the BF antenna port, and the UL path transfer function $h_{ULi}(\omega)$, defined as the ratio of the Fourier transform of the signal out of the BF antenna port over the signal into the UF antenna port, where the subscript indicates the ith pair of DL path and UL path. All AFRs send the $h_{DLi}(\omega)$ and $h_{ULi}(\omega)$ to the MU-BFer, which forms the Relay DL and UL transfer function matrices $H_{RDL}(\omega)$ and $H_{RUL}(\omega)$. These transfer function matrices are much slower varying than the OTA channels between the AFRs and the UEs.

Next, each of the AFRs sends orthogonal pilot signal to the BS, where the orthogonality may be in frequency, time, code or a combination. The BS uses the received pilot signal to estimate the UL Relay to BS OTA channel matrix $H_{RtB}(\omega)$, e.g., using a relative calibration method. Because of the reciprocity of the OTA channel, the DL BS to Relay matrix is now known, $H_{BtR}(\omega)=H_{RtB}(\omega)$. Since the AFRs are in fixed location with fixed configuration, or relatively more fixed than UEs, the coherence time of the channel matrix $H_{RtB}(\omega)$, hence $H_{BtR}(\omega)$, is longer than the channel matrix of from the UEs to Relays $H_{UtR}(\omega)$.

Next, one or more UEs sends pilot signal to the BS while the relays are operating. More than one UE can send pilot signals to the BS simultaneously using orthogonal pilots, where the orthogonality may be in frequency, time, code or a combination. The MU-BFer in the BS uses the received pilot signal to estimate the UL UE to BS OTA channel matrix $$H_{UtB}(\omega)=H_{RtB}(\omega)H_{RUL}(\omega)H_{UtR}(\omega)$$

Figure 9:
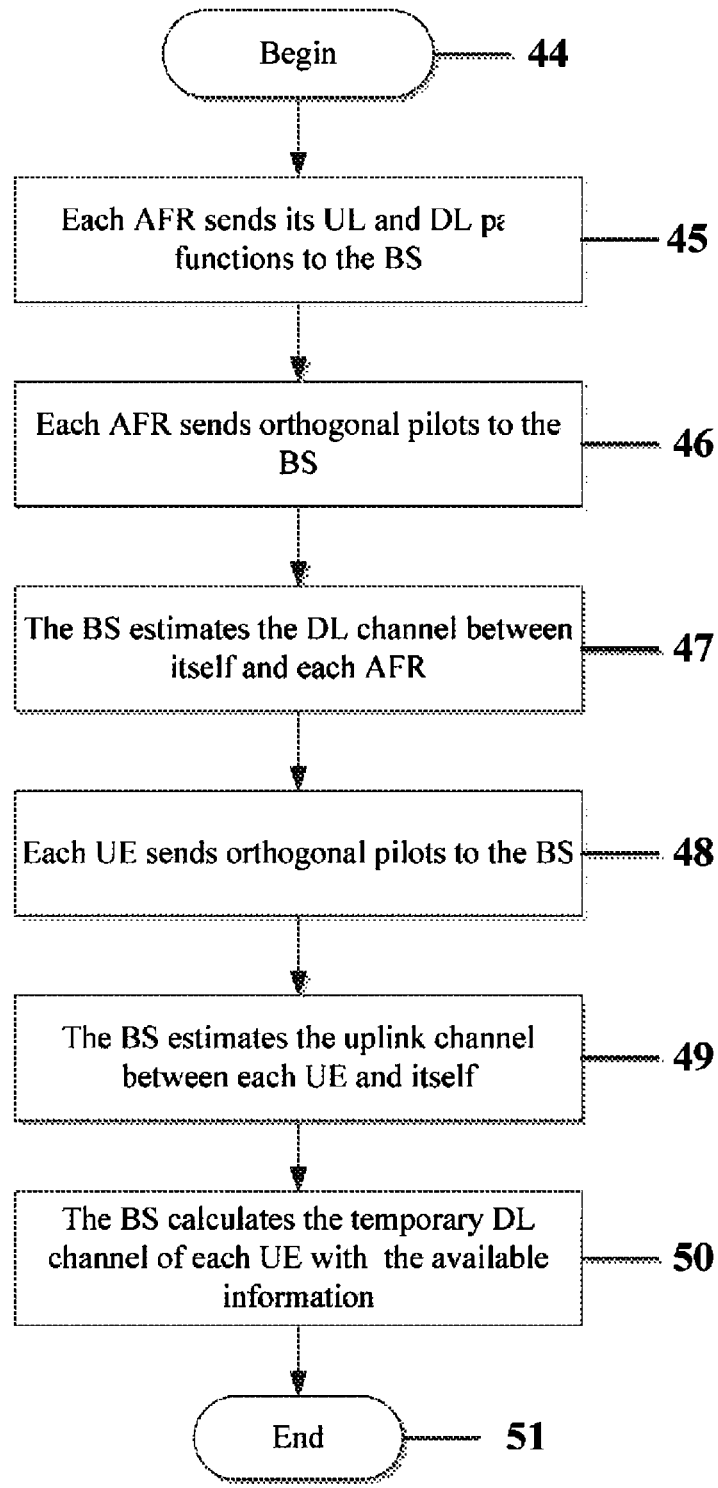
FIG. 9 shows the process of estimating the Downlink (DL) temporary channel of a UE with non-symmetrical AFRs.

Already having the information of $H_{RDL}(\omega)$ and $H_{RUL}(\omega)$ sent by the AFRs, and the OTA channel between the BS and AFRs $H_{BtR}(\omega)=H_{RtB}(\omega)$, the MU-BFer can then obtain a scaled estimate of the DL BS to UE OTA TC $H_{BtU}(\omega)$ by performing the following computation:

$$\beta_U H_{BtU}(\omega)=\beta_U H_{BtR}(\omega)H_{RDL}(\omega)(H_{RUL}^H(\omega)H_{RUL}(\omega))^{-1}H_{RUL}^H(\omega)(H_{RtB}^H(\omega)H_{RtB}(\omega))^{-1}H_{RtB}^H(\omega)H_{UtB}(\omega)=\beta_U H_{BtR}(\omega)H_{RDL}(\omega)H_{RtU}(\omega).$$

where $H_{BtU}(\omega)$ is scaled by a diagonal matrix $\beta_U$ whose kth diagonal element is a scaling factor that only depends on the kth UE. Since $H_{RDL}(\omega)$, $H_{RUL}(\omega)$ and $H_{BtR}(\omega)$ are slow varying relative to $H_{RtU}(\omega)$, this embodiment allows the DL TC $H_{BtU}(\omega)$ to be updated with the more frequent estimation of $H_{RtU}(\omega)$ using UL pilot signaling, which scales with the number of served UEs, without requiring DL pilot signaling and UL feedback and without requiring an AFR to perform channel estimation. The estimation of $H_{RDL}(\omega)$, $H_{RUL}(\omega)$ and $H_{BtR}(\omega)$ can be performed less frequently, depending on the coherence time of the channel or transfer functions. This process is shown in FIG. 9. It begins 44 when each AFR sends its UL and DL path functions to the BS 45. Then, each AFR sends orthogonal pilots to the BS 46. After received the pilot signals, the BS estimates the DL channel between itself and each AFR 47. Then, each UE sends orthogonal pilots to the BS 48. After received the pilot signals, the BS estimates the DL channel between itself and each UE 49. Finally, the BS calculates the temporary DL channel of each UE with the available information 50 and comes to the end 51.

When the direct BS to UEs channel, i.e., signals from BS antennas directly to UEs antennas, is sufficiently weaker than AFRs to UEs channel, it can be treated as noise, the above method provides a good estimation of the DL channel using UL pilot signaling. When direct BS to UE channel needs to be included for accurate beamforming, the BS to UE TC $H_{BtU}^{total}(\omega)$ is a sum of direct BS to UEs channel $H_{BtU}^{direct}(\omega)$ and the AFR to UE channel.

$$H_{BtU}^{total}(\omega)=H_{BtU}^{direct}(\omega)+H_{BtR}(\omega)H_{RDL}(\omega)H_{RtU}(\omega)$$
and correspondingly, $$H_{UtB}^{total}(\omega)=H_{UtB}^{direct}(\omega)+H_{RtB}(\omega)H_{RUL}(\omega)H_{UtR}(\omega).$$

The above embodiment is expanded to include the following. The AFRs are first switched off from transmitting, and the UEs transmit first UL orthogonal pilot signals to the BS. The BS uses the received first pilot signal(s) to obtain a scaled estimate of $H_{UtB}^{direct}(\omega)$ thereafter a scaled estimate of $H_{BtU}^{direct}(\omega)$ from channel reciprocity. Then, the transmission of the AFRs is switched on and the UEs transmit second UL orthogonal pilot signals to the BS. The BS uses the received second pilot signal(s) to obtain a scaled estimate of $H_{UtB}^{total}(\omega)$. Note that when the two estimates are estimated sufficiently close together in time, the scaling factor for both the estimates are the same, both being a diagonal matrix $\beta_U$ whose kth diagonal element is a scaling factor that only depends on the kth UE. Therefore, the BS can then obtain a scaled estimate of the total BS to UE DL channel $H_{BtU}^{total}(\omega)$ from channel reciprocity by $$\beta_U H_{BtU}^{total}(\omega)=\beta_U H_{BtU}^{direct}(\omega)+\beta_U H_{BtR}(\omega)H_{RDL}(\omega)(H_{RUL}^H(\omega)H_{RUL}(\omega))^{-1}H_{RUL}^H(\omega)(H_{RtB}^H(\omega)H_{RtB}(\omega))^{-1}H_{RtB}^H(\omega)[H_{UtB}^{total}(\omega)-H_{UtB}^{direct}(\omega)]$$
$$=\beta_U H_{BtU}^{direct}(\omega)+\beta_U H_{BtR}(\omega)H_{RDL}(\omega)H_{RtU}(\omega).$$

Figure 10:
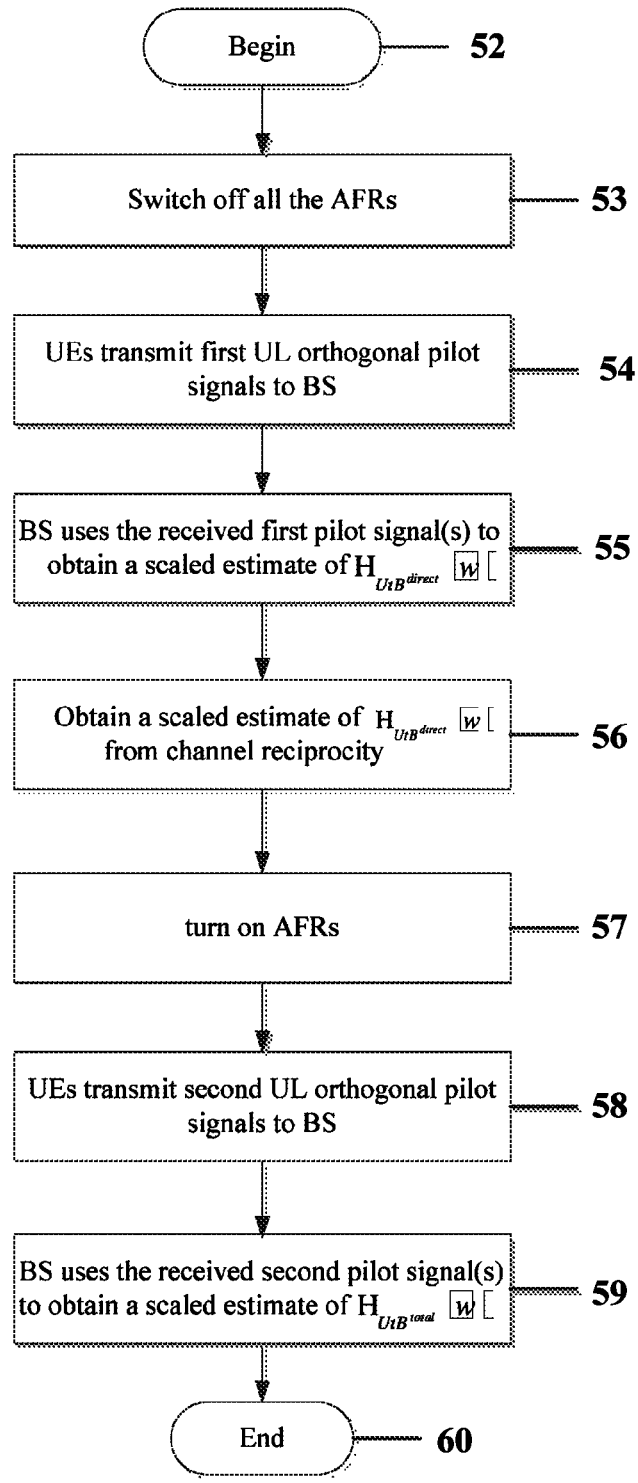
FIG. 10 shows the process of estimating the DL Total Channel (TC) of a UE with non-symmetrical AFRs.

The switching on/off of the transmission of the AFRs can be done by having the BS sending a command over a control channel to the AFRs. This avoids requiring the AFRs to synchronize in time with the BS and UE. This process is shown in FIG. 10. It begins 52 when all the AFRs are switched off 53. Then, UEs transmit first UL orthogonal pilot signals to BS 54. After received the pilot signals, BS uses the received first pilot signal(s) to obtain a scaled estimate of $H_{UtB}^{direct}(w)$ 55 and obtain a scaled estimate of $H_{UtB}^{direct}(w)$ from channel reciprocity 56. Then, the AFRs are turned on 57 and UEs transmit second UL orthogonal pilot signals to BS 58. After received the pilot signals, the BS uses the received second pilot signal(s) to obtain a scaled estimate of $H_{UtB}^{total}(w)$ 59 and comes to the end 60.

The above method for one hop AFR systems can be extended directly to the multi-hop case, where the UL and DL path transfer function of each hop can be removed and included similarly.

Using either of the TC estimation embodiments above, after the BS to UE DL channels are estimated, the BS can use the TC matrix to compute the pre-coding matrix to beamform to the UEs, with the effect of the AFRs included in the beamforming. Therefore, one embodiment of a MU-MIMO wireless system or communication method, as shown in FIG. 1, comprises one or more BSs, each with a large number of antennas, whereas the antennas of a BS may be arranged in a single array with antenna separations from half wavelength to several wavelengths, or in multiple sub-arrays whereas the sub-arrays are distributed over an area; a number of AFRs distributed over the coverage area(s) of the one or more BSs, preferably placed in locations where the signals from the BS(s) are weak; each AFR performing self-calibration to estimate its DL and UL transfer functions and transmitting the estimation to a BS; having each AFR transmitting pilots signals to a BS for the BS to estimate the channels between the BS and the AFRs; having each UE transmitting pilots signals to a BS for the BS to estimate the UL channels; the BS using the estimation of the channels between the BS and the AFRs and the UL channels from the UEs to compute an estimation of the DL TC from the BS to the UEs; the BS computing the TC beamforming matrix; and the BS communicating with multiple UEs simultaneously on each resource block using MU-MIMO beamforming by applying the TC beamforming matrix.

Non-Looping Condition and Delays

AFRs in the above embodiments can be in-band or out-band. An out-band AFR communicates with a BS using a first frequency band and with UEs using a second frequency band. Therefore, if the out-band interference to the receiver from the transmitter is still a concern after the isolation between the two directional antennas, it can be further attenuated by a bandpass filter. On the other hand, an in-band AFR transmits and receives simultaneously in the frequency band. As a result, the requirement of isolation between a Tx antenna and a Rx antenna of an AFR is higher for in-band AFRs, where isolation is defined as the attenuation of the Tx signal as seen by the receiving amplifier. This isolation must be higher than the gain of the relay to avoid a positive feedback loop because the relay transmits and receives at the same frequency and same time. The isolation can be increased by using directional or narrow beam Tx and Rx antennas that face different directions, preferably with sufficient angular separation, or by increasing the distance between Tx and Rx antennas. When high gain is required and the isolation is not high enough, active signal cancellation can be used to increase the isolation between the Tx and Rx. This embodiment is filed in our provisional patent application entitled "Symmetric and Full Duplex Relays in Wireless Systems" filed on the same day as this application.

The use of AFRs introduces additional delays into the TC. Given an isolation between a Tx antenna and a Rx antenna of an in-band AFR, with or without active cancelation, if there is still residual self interference from the Tx signal, the residual self interference will pass through the AFR again and emit from the Tx antenna as a further delayed signal. This process will continue until the self interference falls below the receiving noise floor of the AFR. One embodiment for selecting the gain of an AFR comprising determining the maximum delay spread S introduced by residual self interference looping through the AFR that can be allowed; selecting the gain G of the AFR such that G+A<L<0 where G is the gain of the AFR, A<0 is the attenuation of the Tx signal seen at the Rx antenna, and L<0 is the loop gain as seen at the Rx antenna, all are in dB; and nD≤S where D is the delay of the AFR and $$n = \left\lceil \left| \frac{X-N}{L} \right| \right\rceil,$$

that is, round up of $$\left| \frac{X-N}{L} \right|$$

to the next larger integer, where X is the power of the remote signal from BS or UE reaching the AFR in dBm, e.g., −50 dBm, N<0 is the receiving noise floor of the AFR, e.g., −100 dBm. For example, if X=50 dBm, N=−100 dBm, D=100 ns, S=300 ns, A=−70 dB, then n≤3, and G can be chosen to be 50 dB.

Figure 11:
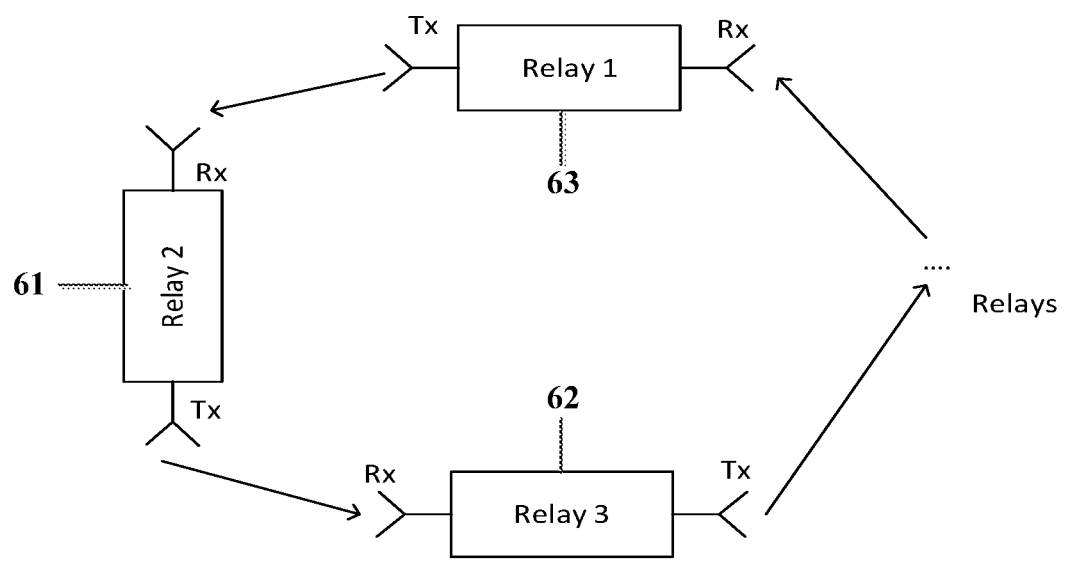
FIG. 11 shows an example of a loop formed by AFRs.

The BF antenna(s) and UF antenna(s) of an AFR are directional antennas, and arrangement of the AFRs should satisfy the non-looping condition, i.e., the sum loop gain $G^{\Sigma loop}$ is less than a threshold, which is negative, e.g., −35 dB, where the sum loop gain is the power of the sum of the signals $\Sigma_{i=\{all\ loops\}} s_i^{Tloop}$ from all loops $s_i^{Tloop}$ of an AFR over the power of the signal $s^{Tout}$ coming out of a transmitting antenna of an originating AFR, and a loop is defined as the path starting from the signal $s^{Tout}$, passing through one or more other AFR(s), coming back over the air to a receiving antenna of the same originating AFR and then via the amplifier path to reach the same transmitting antenna of the originating AFR, as illustrated in FIG. 11, i.e., $s_i^{Tloop} = H_i^{Tloop} * s^{Tout}$ where $H_i^{Tloop}$ is the channel of the i-th loop. For each transmitting antenna of an AFR, there may be multiple loops. The non-looping condition is given as $$G^{\Sigma loop} = \frac{P\{\Sigma_{i=\{all\ loops\}} s_i^{Tloop}\}}{P\{s^{Tout}\}} < G^{threshold} < 0$$

where P{•} indicates the power of the signal inside the parenthesis. In FIG. 11, the signals forwarded by the AFR 61 are relayed by several AFRs, e.g., AFR 62, and then are forwarded back to AFR 61 again by AFR 63.

The loop gain of a loop that only includes a pair of transmitting antenna and receiving antenna of the same AFR is called the isolation between the BF antennas and the UF antennas. It is desired that this isolation to be very high to facilitate the simultaneous transmitting by one and receiving by the other in the same frequency band(s). This can be achieved by making the BF antenna and UF antenna directional, facing away from each other and placing separating materials between the two antennas. This loop only includes the attenuation of the signal from the transmitting antenna to the receiving antenna of the same AFR, referred to as $A_{BF \leftrightarrows UF}$ (also referred to as the isolation between the two antennas), multiplied by the gain from receiving antenna to the transmitting antenna, $G_{BF \rightarrow UF}$ of the path from the BF antenna to the UF antenna or $G_{UF \rightarrow BF}$ of the path from the UF antenna to the BF antenna. In a preferred embodiment, the isolation $A_{BF \leftrightarrows UF}$ is significantly higher than the gain $G_{BF \rightarrow UF}$ or $G_{UF \rightarrow BF}$, that is, $A_{BF \leftrightarrows UF} > G_{BF \leftrightarrows UF}$ and $A_{BF \leftrightarrows UF} > G_{UF \rightarrow BF}$, or $A_{BF \leftrightarrows UF} >> G_{BF \rightarrow UF}$ and $A_{BF \leftrightarrows UF} >> G_{UF \rightarrow BF}$. This condition will allow the operation of the AFR without further cancelation of the self-interference from a transmitting antenna to a receiving antenna.

Figure 12:
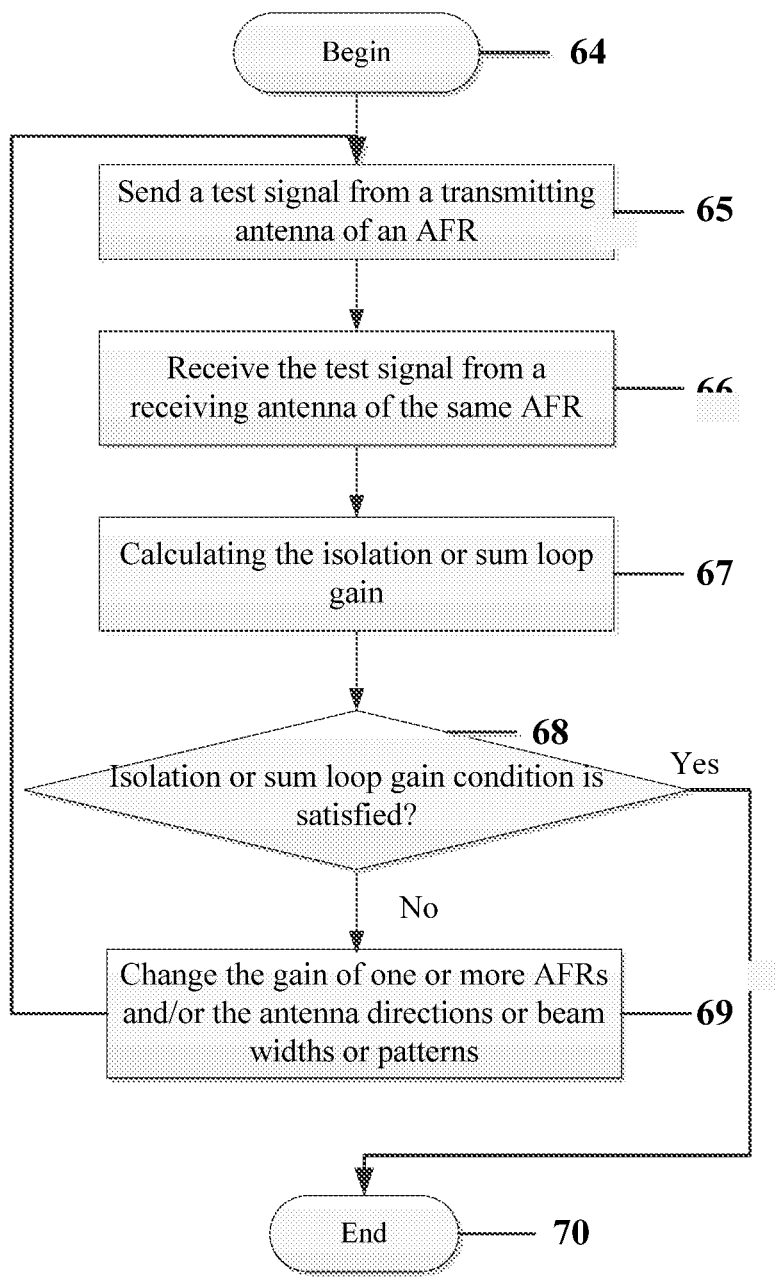
FIG. 12 shows an embodiment of configuring AFRs to satisfy the isolation and loop gain condition.

One embodiment is a method for testing and configuring the AFRs in a coverage area so that they satisfy the non-looping condition, shown in FIG. 12. It begins 64 comprising the AFR sends a test signal from a transmitting antenna 65 and receives the test signal from a receiving antenna 66. Then, the BS calculates the isolation or sum loop gain 67. If the isolation or sum loop gain condition is not satisfied 68, then the gain of one or more AFRs, and/or the antenna directions or beam widths or patterns are changed, either mechanically or preferably electronically when an antenna on an AFR is a smart antenna or a phased array whose direction and/or beam width or pattern can be changed by adjusting the phase and/or attenuation of each element such that the isolation or sum loop gain condition is satisfied 69. Otherwise, it comes to the end 70. The method may be repeated for each AFR in a coverage area or in some conditions for only one or more selected AFRs because meeting the sum loop gain conditions on the selected one or more AFRs will imply meeting the sum loop conditions at all AFRs. This embodiment may further include a self-organizing process comprising of automatically performing the above process and configuring the AFRs to meet the non-looping condition by steering the directions of the BF and UF antennas of the AFRs in the coverage area.

The presence of multiple AFRs in a MU-MIMO system can increase the delay spreads, hence reduce the coherence bandwidth, of the total channels. One embodiment is a method for controlling the delay spreads comprising measuring the delay spreads or coherence bandwidths of TCs; if the delay spreads exceeded the desired values, changing the configurations of the AFRs, including but not limited to, changing the beam patterns, number of placement of AFRs, number of antennas on each AFR, distances among neighboring AFRs, to reduce the delay spreads, thus increase the coherence bandwidth. Once AFRs are deployed, the above embodiment is reduced to changing beam patterns and antenna directions, allowing the AFRs to self organize to achieve desired delay spreads.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claimed:

1. A Multi-User Multiple-Input Multiple-Output (MU-MIMO) wireless communication system comprising:
   a Base Station (BS) with a plurality of antennas, either closely located or distributed;
   a plurality of Amplify and Forward Relays (AFRs) deployed over a coverage area, each AFR has $N_{BF}>1$ BF antennas with a beam pattern facing a MU-BFer and $N_{UF}>1$ UF antennas with a beam pattern facing user equipment (UEs) or downstream AFR(s);
   a channel estimation module for estimating the Total Channels between a plurality of UEs and the BS with the AFRs in place; and
   wherein the MU-BFer uses the estimates of the Total Channels to perform beamforming computations for transmitting and/or receiving multiple spatially multiplexed streams of signals to or from a plurality of UEs using the same frequency resource.

2. The system of claim 1 wherein the beamforming computations include computing precoding matrices and/or detection matrices; and using the precoding or detection matrices to perform beamforming to transmit data to or receive data from multiple UEs using the same frequency resources.

3. The system of claim 1 further comprising a MU-BFer capable of forming and directing B beams; a set of AFRs each of which provides more UF beams than BF beams and the total of UF beams R on all the AFRs is more than the number of beams of the MU-BFer, R>B and typically R>>B; the MU-BFer forming and directing D beams towards a subset of AFRs that are serving K active UEs in the current time slot, where B≥D≥K.

4. The system of claim 1 further comprising an AFR or the MU-BFer selects DL or UL beam(s) on an AFR that is (are) directed towards active UE(s) in the current time slot, and switches off the other beams to save power or concentrating power to the selected beams, wherein when the selection is performed by the MU-BFer, the decision is communicated to AFRs via commands through a control channel.

5. The system of claim 1 further comprising the MU-BFer uses some or all of the antennas of the BS and a subset of AFRs are to perform MU-MIMO beamforming with a selected group of UEs independent of the operations of the AFRs not in the subset, wherein the channel matrix that only includes the channels of the involved antennas of the BS, the subset of AFRs and the selected UEs are used in computing the precoding or detection matrix by the MU-BFer to beamform to the selected UEs.

6. The system of claim 1 further comprising choosing the Guard Period in a TDD system based on the sum of the time in the traditional TDD system plus the total delay introduced by the AFRs in the total channel.

7. The system of claim 1 wherein the number of AFRs $N_{AFR}$ and the number of antennas on the AFRs satisfy the condition $K \leq \min(\Sigma_{i=1}^{N_{AFR}} N_{BF}^i, \Sigma_{i=1}^{N_{AFR}} N_{UF}^i)$, where $N_{BF}^i$ and $N_{UF}^i$ are the numbers of BF and UF antennas at the ith AFR respectively.

8. The system of claim 1 further comprising placing AFRs to improve the signal strength of certain targeted areas and the number of UEs served in the same resource block in a targeted area $\tilde{K}$ satisfies the condition $\tilde{K} \leq \min(\Sigma_{i=1}^{N_{AFR}} \tilde{N}_{BF}^i, \Sigma_{i=1}^{N_{AFR}} \tilde{N}_{UF}^i)$, where $\tilde{N}_{BF}^i$ and $\tilde{N}_{UF}^i$ denote the number of BF and UF antennas for the ith AFR respectively in the targeted area.

9. The system of claim 1 wherein the number of BF and UF antennas satisfies $\min\{\Sigma_{i=1}^{N_{AFR}} N_{BF}^i, \Sigma_{i=1}^{N_{AFR}} N_{UF}^i\} \geq M$.

10. The system of claim 1 wherein the distance $\alpha R_{tx}$ is chosen to be sufficiently close such that there is no loss or almost no loss of SNR in the signal received by the AFR, where $R_{tx}$ is the coverage distance given the maximal transmit power $P_{Tx}$ of a BS or RRH, and an is placed at $\alpha R_{tx}$, $0<\alpha<1$.

11. The system of claim 1 further comprising placing multiple AFRs and/or configuring their antenna directions to provide segmented LoS link with UEs that are in NLoS of BS, wherein each link between the BS and an AFR, between two AFRs, and between an AFR and a UE is LoS.

12. The system of claim 1 further comprising placing one or more AFRs and/or adjusting their configurations to increase multipath richness and/or to increase the DoF for MU-MIMO beamforming in a communication system using LoS dependent carriers.

13. The system of claim 1 further comprising a module that implements a self-organizing process that steers the antennas and/or adjusts the configuration of one or more AFRs based on the number and spatial distribution of UEs that are scheduled to communicate with the BS.

14. The system of claim 13 further comprising the self-organizing process is performed to meet one or more objectives, including but not limited to, rank of the channel matrix, condition number of the channel matrix, desired throughput and priority of each UE, desired modulation order and coding or SINR of each UE, using estimates of total channels of the UEs in the presence of the AFRs.

15. The system of claim 13 wherein decisions in the self-organizing process is made at a central processor, and communicated to the AFRs through a control channel, and/or locally at the AFRs.

16. The system of claim 13 further comprising estimating of how much one or more AFRs contribute to the increase of SINR of UEs or increase the delay spread, and switching off or partially switching off AFRs that do not make appreciable positive contributions to save power and/or improve system performance.

17. The system of claim 13 further comprising selectively turning on or off AFRs in some locations to re-distribute a MU-BFer's beams to different coverage areas based on traffic demand, to a first area at a first time period, to a second area at a second time period.

18. The system of claim 13 further comprising mobile AFRs moving to locations to increase the signal strength of the beams from a MU-BFer to an area that otherwise has weak signal from the MU-BF to project the capacity from one or more far away BSs into the area.

19. The system of claim 13 further comprising symmetric AFRs in a TDD system to enable estimating the DL total channels with the symmetrical AFR(s) in place by having one or more UEs transmitting UL pilot signal(s), MU-BFer using the received pilot signal(s) to estimate the over the air total channel from a UE to the MU-BFer, and using this estimate as the estimate of the OTA channel from the MU-BFer to the UE.

20. The system of claim 13 further comprising AFRs with non-symmetrical DL path and UL path, wherein a calibration process is used comprising each AFR finding its DL path transfer function $h_{DLi}(\omega)$ and the UL path transfer function $h_{ULi}(\omega)$; all AFRs sending their $h_{DLi}(\omega)$ and $h_{ULi}(\omega)$ to the MU-BFer, which forms the Relay DL and UL transfer function matrices $H_{RDL}(\omega)$ and $H_{RUL}(\omega)$; each AFR sending orthogonal pilot signal to the BS; the BS using the received pilot signal to estimate the UL Relay to BS over the air channel matrix $H_{RtB}(\omega)$; based on reciprocity of the over the air channel channel, obtain the DL BS to Relay matrix $H_{BtR}(\omega)=H_{RtB}(\omega)$; one or more UEs sending pilot signals to the BS while the relays are operating; the MU-BFer in the BS using the received pilot signal to estimate the UL UE to BS OTA channel matrix $H_{UtB}(\omega)=H_{RtB}(\omega)H_{RUL}(\omega)H_{UtR}(\omega)$; the MU-BFer obtaining a scaled estimate of the DL BS to UE over the air total channel $H_{BtU}(\omega)$ by performing the following computation:

$$\beta_U H_{BtU}(\omega)=\beta_U H_{BtR}(\omega)H_{RDL}(\omega)(H_{RUL}{}^H(\omega)H_{RUL}(\omega))^{-1}H_{RUL}{}^H(\omega)(H_{RtB}{}^H(\omega)H_{RtB}(\omega))^{-1}H_{RtB}{}^H(\omega)H_{UtB}(\omega)=\beta_U H_{BtR}(\omega)H_{RDL}(\omega)H_{RtU}(\omega),$$

where $H_{BtU}(\omega)$ is scaled by a diagonal matrix $\beta_U$ whose kth diagonal element is a scaling factor that only depends on the kth UE.

21. The system of claim 13 further comprising obtaining estimates of direct BS to UE channel in the total channel estimates.

22. The system of claim 13 wherein the arrangement of the AFRs satisfy the non-looping condition.

23. The system of claim 13 wherein the placement and configuration of AFRs are tested to ensure they satisfy the non-looping condition, and if not, the AFRs settings are changed to satisfy the non-looping condition.

24. The system of claim 13 wherein the delay spreads or coherence bandwidths of total channels due to the placement and configuration of AFRs are measured, and if the delay spreads exceeded the desired values, configurations of the AFRs are adjusted to reduce the delay spreads.

25. A Multiple-Input Multiple-Output (MIMO) Amplify and Forward Relay (AFR) for MU-MIMO wireless communication system comprising:
   $N_{BF}>2$ BF antennas with a beam pattern facing a MU-BFer and $N_{UF}>2$ UF antennas with a beam pattern facing user equipment (UEs) or downstream AFR(s);
   a first RF path for each pair of BF and UF antennas that amplifies and forwards multiple spatially multiplexed RF signals from a Base Station (BS) to one more UEs;
   a second RF path for each pair of BF and UF that amplifies and forwards multiple spatially multiplexed RF signals from one or more UEs to a BS, wherein the second RF path amplifies and forwards pilot signals from one or more UEs to the BS for estimating the total channels between a plurality of UEs and the BS with the AFRs in place; and
   a control module that communicates with the BS to configure the AFR to avoid loops with other AFRs in the network, to change the gains and other properties to enhance the MU-MIMO communication between the BS and a plurality of UEs.

26. The AFR of claim 25, wherein the first RF path and the second RF path are the same path for use in a TDD network.

27. The AFR of claim 26 further comprising selecting the gain of an AFR comprising determining the maximum delay spread S introduced by residual self interference looping through the AFR that can be allowed; selecting the gain G of the AFR such that G+A<L<0 where G is the gain of the AFR, A<0 is the attenuation of the Tx signal seen at the Rx antenna, and L<0 is the loop gain as seen at the Rx antenna, all are in dB; and nD≤S where D is the delay of the AFR and $$n = \left\lceil \left| \frac{X-N}{L} \right| \right\rceil,$$

where X is the power of the remote signal from BS or UE reaching the AFR in dBm.

28. The AFR of claim 25, further comprising equipping the DL path from a BF antenna port to a UF antenna port and/or a UL path from a UF antenna port to a BF antenna port with circuit element(s) whose parameter(s) can be adjusted to change the DL and/or UL transfer function of a RF path in the AFR, and changing the parameters to create a channel matrix that is conducive to MU-MIMO.

29. The AFR of claim 28 further comprising communicating with a BS using a first frequency band and with UEs using a second frequency band.

30. The AFR of claim 25, further comprising a BF antenna of AFR having a narrow beam pointing to a fixed location.

31. The AFR of claim 25, wherein NUF>NBF.

32. The AFR of claim 25, wherein each UF antenna produces multiple beams.

33. The AFR of claim 25, further comprising an antenna having steerable or switchable directional beams, and the direction of the antennas beam is steered or switched on/off based on the distribution of the UEs in the coverage area.

34. The AFR of claim 25, wherein the AFR is capable of producing multiple simultaneous UF beams, for either transmitting DL to UE or receiving UL from UE, turning on or off a UF beam based on detection of the existence or absence of UEs in the coverage area of the UF beam.

* * * * *